(12) United States Patent
Dohr et al.

(10) Patent No.: US 12,393,043 B2
(45) Date of Patent: *Aug. 19, 2025

(54) LONG-RANGE OPTICAL DEVICE WITH AN OPTO-ELECTRONIC DISPLAY

(71) Applicant: Swarovski-Optik AG & Co KG., Absam (AT)

(72) Inventors: Mario Dohr, Innsbruck (AT); Herbert Hermann, Hall (AT); Thomas Salzburger, Stans (AT); Wilfried Thaler, Kramsach (AT); Rene Zangerl, Hall (AT)

(73) Assignee: Swarovski-Optik AG & Co KG. (AT)

( * ) Notice: Subject to any disclaimer, the term of this patent is extended or adjusted under 35 U.S.C. 154(b) by 2 days.

This patent is subject to a terminal disclaimer.

(21) Appl. No.: 18/411,895

(22) Filed: Jan. 12, 2024

(65) Prior Publication Data
US 2024/0160030 A1 May 16, 2024

Related U.S. Application Data

(63) Continuation of application No. 17/961,327, filed on Oct. 6, 2022, now Pat. No. 11,906,755, which is a (Continued)

(30) Foreign Application Priority Data
Jul. 22, 2016 (AT) ............... A 50674/2016

(51) Int. Cl.
*G02B 23/00* (2006.01)
*F41G 1/34* (2006.01)
(Continued)

(52) U.S. Cl.
CPC ............ *G02B 27/36* (2013.01); *F41G 1/345* (2013.01); *F41G 1/38* (2013.01); *F41G 3/06* (2013.01);
(Continued)

(58) Field of Classification Search
CPC ........ G02B 23/00; G02B 23/02; G02B 23/04; G02B 23/08; G02B 23/10; G02B 23/105;
(Continued)

(56) References Cited

U.S. PATENT DOCUMENTS 3,074,315 A 1/1963 Seibel et al.
4,395,096 A 7/1983 Gibson
(Continued)

FOREIGN PATENT DOCUMENTS

AT       506437 A1   9/2009
AT       514321 A4   12/2014
(Continued)

OTHER PUBLICATIONS

Extended European Search Report for EP Application No. 17182613, mailed Nov. 27, 2017.
(Continued)

*Primary Examiner* — Thong Q Nguyen
(74) *Attorney, Agent, or Firm* — Lerner David LLP

(57) ABSTRACT

The technology relates to a long-range optical device for a firearm with an objective and an eyepiece, through which an observation beam path is formed for aiming at a target, the long-range optical device further comprising an opto-electronic display device, wherein the display device comprises an LCoS display for displaying variable data or a target mark, wherein a display beam path of the display device runs at least partly in the observation beam path for displaying the remote object.

11 Claims, 15 Drawing Sheets

Related U.S. Application Data continuation of application No. 16/875,254, filed on May 15, 2020, now Pat. No. 11,493,778, which is a continuation of application No. 15/655,559, filed on Jul. 20, 2017, now Pat. No. 10,698,229.

(51) Int. Cl.
| | | |
|---|---|---|
| *F41G 1/38* | (2006.01) | |
| *F41G 3/06* | (2006.01) | |
| *G01C 3/04* | (2006.01) | |
| *G02B 7/02* | (2021.01) | |
| *G02B 23/08* | (2006.01) | |
| *G02B 23/10* | (2006.01) | |
| *G02B 23/14* | (2006.01) | |
| *G02B 23/16* | (2006.01) | |
| *G02B 27/34* | (2006.01) | |
| *G02B 27/36* | (2006.01) | |
| *G09G 3/36* | (2006.01) | |

(52) U.S. Cl.
CPC ............. *G01C 3/04* (2013.01); *G02B 7/023* (2013.01); *G02B 23/105* (2013.01); *G02B 23/14* (2013.01); *G02B 23/145* (2013.01); *G02B 23/16* (2013.01); *G02B 27/34* (2013.01); *G09G 3/36* (2013.01)

(58) Field of Classification Search
CPC .... G02B 23/1214; G02B 23/14; G02B 23/16; G02B 23/18; F41G 1/00; F41G 1/06; F41G 1/32; F41G 1/34; F41G 1/345; F41G 1/38
USPC .................................. 359/399–430
See application file for complete search history.

(56) References Cited

U.S. PATENT DOCUMENTS

| | | | |
|---|---|---|---|
| 4,408,842 A | | 10/1983 | Gibson |
| 4,909,614 A | | 3/1990 | Itoh et al. |
| 5,463,495 A | | 10/1995 | Murg |
| 5,764,410 A | | 6/1998 | Jibiki |
| 5,771,623 A | | 6/1998 | Pernstich et al. |
| 6,005,711 A | | 12/1999 | Mai et al. |
| 6,137,636 A | * | 10/2000 | Smith ............... G02B 23/14 |
| | | | 359/633 |
| 6,469,829 B2 | | 10/2002 | Otteman |
| 6,563,648 B2 | | 5/2003 | Gleckman et al. |
| 6,995,905 B2 | | 2/2006 | Wagner |
| 7,978,415 B2 | | 7/2011 | Schoenenberger et al. |
| 8,717,548 B2 | | 5/2014 | Pernstich et al. |
| 9,488,825 B2 | | 11/2016 | Sigmund |
| 9,958,666 B2 | | 5/2018 | Ingenito |
| 10,534,166 B2 | | 1/2020 | Summerfield et al. |
| 10,698,229 B2 | | 6/2020 | Dohr et al. |
| 11,493,778 B2 | * | 11/2022 | Dohr ............... G02B 23/105 |
| 2006/0164857 A1 | | 7/2006 | Morejon et al. |
| 2007/0035824 A1 | * | 2/2007 | Scholz ............... H04N 23/20 |
| | | | 348/E5.142 |
| 2009/0174939 A1 | | 7/2009 | Heintz et al. |
| 2013/0033746 A1 | | 2/2013 | Brumfield |
| 2013/0162673 A1 | | 6/2013 | Bohn |
| 2013/0199074 A1 | | 8/2013 | Paterson et al. |
| 2015/0338191 A1 | | 11/2015 | Maryfield et al. |
| 2015/0345906 A1 | | 12/2015 | Varshneya et al. |

FOREIGN PATENT DOCUMENTS

| | | |
|---|---|---|
| DE | 102008003414 A1 | 7/2009 |
| EP | 0315853 A1 | 5/1989 |
| EP | 0709705 A2 | 5/1996 |
| EP | 2138885 A1 | 12/2009 |
| EP | 2813795 A1 | 12/2014 |
| GB | 2512915 A | 10/2014 |
| TW | 200819711 A | 5/2008 |
| WO | 02082003 A2 | 10/2002 |
| WO | 2014130128 A2 | 8/2014 |

OTHER PUBLICATIONS

Extended European Search Report for Application No. 20175046.0 dated Aug. 18, 2020, pp. 1-3.

* cited by examiner

LONG-RANGE OPTICAL DEVICE WITH AN OPTO-ELECTRONIC DISPLAY

CROSS-REFERENCE TO RELATED APPLICATIONS

The present application is a continuation of U.S. patent application Ser. No. 17/961,327, filed Oct. 6, 2022, which is now U.S. Pat. No. 11,906,755, which is a continuation of U.S. patent application Ser. No. 16/875,254, filed May 15, 2020, which is now U.S. Pat. No. 11,493,778, which is a continuation of U.S. patent application Ser. No. 15/655,559, filed Jul. 20, 2017, which is now U.S. Pat. No. 10,698,229, which claims priority from Austrian Patent Application No. A50674/2016, filed Jul. 22, 2016, the disclosures of which are hereby incorporated by reference.

BACKGROUND OF THE INVENTION

The invention relates to a long-range optical device and a method for producing a superimposed image in a long-range optical device with at least one observation beam path for representing a remote object.

BRIEF SUMMARY OF THE INVENTION

Long-range optical devices, such as for example binoculars or telescopic sights, comprise in part different additional devices, in which data or information is also represented in the field of vision of the observer. This is the case for example in binoculars which are fitted with a laser rangefinder. An image produced by a liquid crystal display for showing the numeral results of the rangefinder is here superimposed over the image of the observed remote object by displaying through a partly transparent prism in an intermediate image plane of the optical observation beam path. An observer, when looking through the eyepiece of the binoculars, can thus read the results of the rangefinder in addition to seeing the image of the observed surroundings in the represented field of vision. Furthermore, telescopic sights in addition to laser range finders also comprise additional devices such as inclinometers, thermometers, barometers, graticule lighting, ballistics computers or the like. Instead of using a standard graticule with an engraved cross hair, in modern telescopic sights target marks generated by a display, which are thus variable, are being used increasingly. By means of a ballistics computer on the basis of the determined distance and the measurement of other ballistically relevant variables the position of an adjustable cross hair or target mark are calculated and shown on a display. In addition to generating the target mark the display can also be used at the same time for displaying numerical values, for example the distance or other variables. In the case of a target mark produced in this way it is also particularly important in practice that the latter needs to be clearly visible even in different environmental light conditions. The quality requirements for the opto-electronic display element used are therefore very high.

The power required to operate such sensors, display devices and controls is usually provided by a battery integrated into the devices. Due to the space required and the weight of the batteries the capacity of the latter is naturally limited. Nevertheless, the possible period of use and the number of potential measurement cycles should be a great as possible.

The high level of integration of different optical and electronic components is a particular challenge for the construction of telescopic sights. Thus there is competition for the space required by the individual components and also for the free space required for manipulating the individual components within the housing of the long-range optical device. In this case also individual manipulations, such as focusing the image of the remote object, changing the enlargement setting and also adjusting the target mark to a point of impact of a projectile when shooting together with a firearm should be able to be performed as far as possible without affecting one another.

Therefore, the objective of the invention is to improve a long-range optical device in order to satisfy said requirements.

Said objective of the invention is achieved by a long-range optical device comprising an objective, a lens-reversing system and an eyepiece, by means of which an observation beam path is formed, wherein the long-range optical device is designed to have a graticule for aiming at a target and a laser rangefinder, wherein a transmitting beam path of a laser transmitter of the laser rangefinder runs at least partly in the observation beam path, and wherein a joint is arranged in an objective housing and at least one lens of the objective is mounted movably by the joint in the objective housing, and wherein the joint comprises a bearing housing secured in the objective housing and a lens tube, wherein at an object-side end of the lens tube a front objective lens system of the objective is arranged and an eyepiece side end of the lens tube is mounted pivotably in the bearing housing. This has the advantage that the target mark can be adjusted to the point of impact when focusing the long-range optical device together with a firearm and the pivoting of the line of sight solely by moving the foremost, front objective lens system of the objective. Thus a suitable amount of space only needs to be provided in this area. Other optical, mechanical, and also electronic components provided between the objective on the one hand and the eyepiece on the other hand can be mounted securely in the housing from the start during the manufacture of the long-range optical device. This has the advantage of providing greater recoil resistance. Thus also despite the additional arrangement of electronic components, for example the control and also the power supply, a diameter of the central tube of a maximum of about 40 mm can be maintained in the central tube of the housing of the long-range optical device.

In a further embodiment variant of the long-range optical device the latter is provided with an opto-electronic display device for displaying variable data or a target mark, wherein a display beam path of the opto-electronic display device runs at least partly in the observation beam path for displaying the remote object and the display device comprises a LCoS display (LCoS=Liquid Crystal on Silicon). This has the advantage that in this way high quality images can be superimposed in the field of vision on the observed remote object. In particular, high contrast images can be produced in this way.

According to a preferred development of the device, the display device comprises an illuminating prism and a display prism, wherein an area of the transition of the display beam path to the observation beam path is localized in the display prism.

It is also advantageous if the device comprise a lens-reversing system arranged between an objective and an eyepiece, and the display prism is arranged between the lens-reversing system and the eyepiece.

In an alternative embodiment the display device comprises an illuminating prism and a display prism, wherein the device comprises a prism reversing system arranged between an objective and an eyepiece and an area of the transition of the display beam path is localized in the observation beam path on a prism of the prism reversing system.

The development of the device in which a wave plate is arranged between the illuminating prism and the LCoS display, which wave plate is preferably in the form of an λ/4 plate, has the advantage of providing a high yield of polarized light, which is needed for illuminating the LCoS display. It is an advantage in particular, that in this way the contrast of the image is more uniform in all areas.

It is also an advantage that the LCoS display and the wave plate and the wave plate and the illuminating prism are joined together respectively by adhesion, as in this way a compact assembly is formed, the components of which can be adjusted reliably and permanently during manufacture. In addition, it is also possible that the illuminating prism and the display prism are joined together by adhesion.

In the development of the long-range optical device, in which the latter comprises a rangefinder with a laser transmitter and a laser receiver and the latter also comprise an inclinometer, the long-range optical device can be used as a telescopic sight.

In the development in which the long-range optical device comprises a main control unit with a ballistics computer and wherein the main control unit is designed for producing image information for illustrating a variable graticule on the LCoS, it is an advantage that in this way it is possible to produce a telescopic sight that is very user-friendly when aiming at a target.

The objective of the invention also achieved independently by a method for producing a superimposed image in a long-range optical device, wherein the long-range optical device is designed with at least one observation beam path for displaying a remote object and with an opto-electronic display device for displaying variable data or a target mark and wherein an image of the variable data or the target mark is projected by a display beam path of the display device into the observation beam path and wherein furthermore the image of the variable data or the target mark is produced by an LCoS display. In this way in an advantageous manner high quality images can be superimposed onto the visual field of the observed remote object.

According to a preferred embodiment variant of the method the main control unit calculates the image information data for displaying a variable graticule and the latter is transmitted to the display control for controlling the LCoS display. This enables the particularly user-friendly operation of a corresponding telescopic sight.

For a better understanding of the invention the latter is explained in more detail with reference to the following Figures.

BRIEF DESCRIPTION OF THE DRAWINGS

In a much simplified, schematic representation.

DETAILED DESCRIPTION

Figure 1:
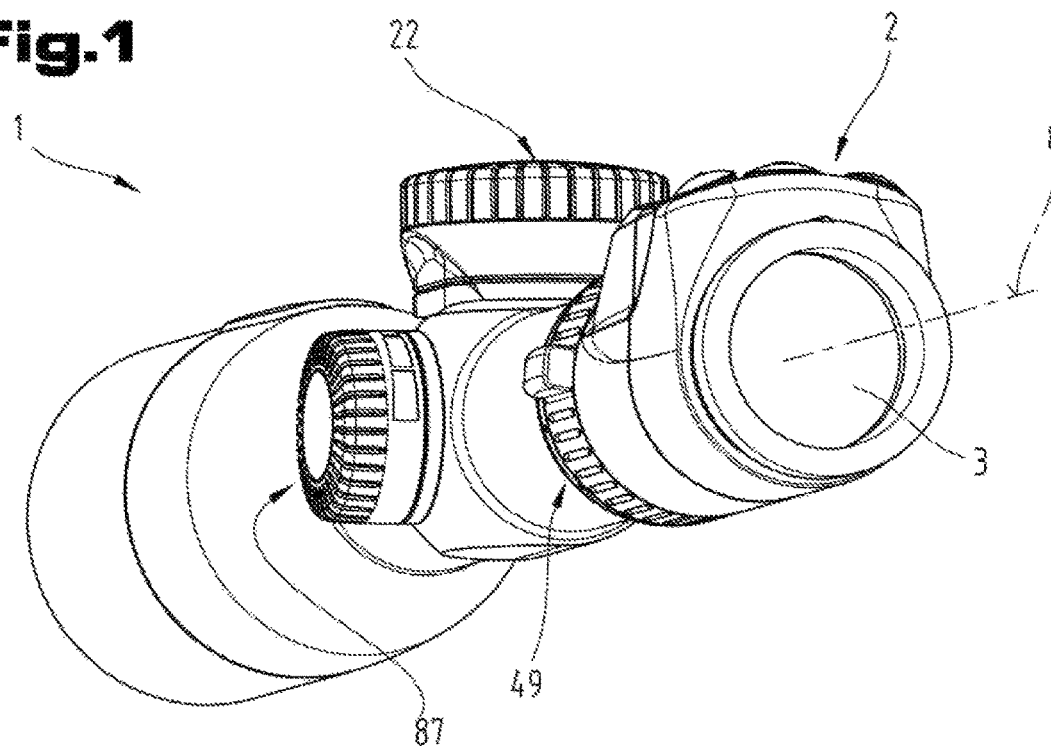
FIG. 1 is a long-range optical device formed by a telescopic sight.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a telescopic sight as a first example embodiment of a long-range optical device 1 in perspective view. According to the chosen direction of view, an eyepiece housing 2 is shown with an eyepiece 3 in the foreground (on the right of the figure).

Figure 2:
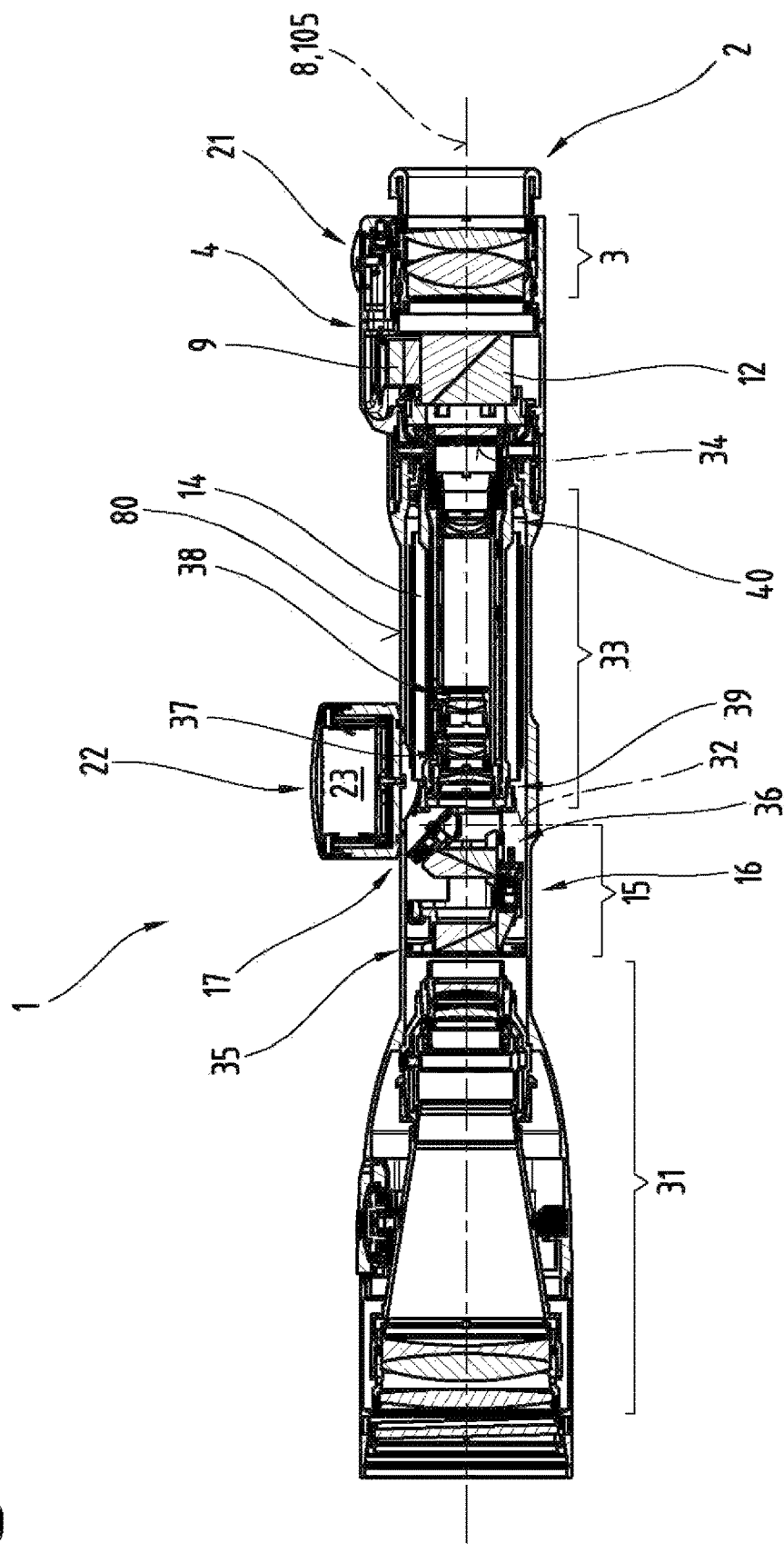
FIG. 2 is a longitudinal cross-section of the telescopic sight according to FIG. 1.

FIG. 2 shows a longitudinal cross-section of the telescopic sight according to FIG. 1. As explained in more detail in the following, when a user looks through the eyepiece 3 he sees the superimposing of an image consisting of the image of a remote object and an image produced by a display device 4. The image or the display of the display device 4 passes via an illuminating prism 9 and a display prism 12 to an observation beam path 8 and then to the eye of an user. Here the light beams coming from the display device 4 are deflected on a diagonal interface 85 of the display prism 12 in the form of a beam splitter cube with a reflection of 90°, and thus directed in the direction of the eyepiece 3 and into the observation beam path 8. In addition, the image of the remote object is displayed by an objective 31 in a first intermediate image plane 32. Said image of the first intermediate image plane 32 is displayed by means of a lens reversing systems 33 in a second intermediate image plane 34 or in the image plane of the eyepiece 3. A user thus sees a superimposing of the image of the remote object and of the image produced by the display device 4.

In one embodiment variant of the long-range optical device a physical graticule is also arranged in the beam path of the long-range optical device 1. Said graticule can be formed for example by a cross-hair or a reticle. Preferably, the physical graticule is arranged in the second intermediate image plane 34. By additionally providing a physical graticule the long-range optical device 1 can thus also be used for aiming at a target when the display device fails, for example due to insufficient power supply.

The telescopic sight and/or the long-range optical device 1 comprise(s) a rangefinder 15 with a laser transmitter 16 and a laser receiver 17. Laser light emitted by the laser transmitter 16 is directed to a remote object, reflected by the latter and the reflected radiation is detected by the laser receiver 17, wherein the beam path 8 of the objective 31 is used for emitting the laser light though the laser transmitter 16 and for receiving the reflected laser radiation through the laser receiver 17. The beam path of the laser transmitter 16 and the beam path of the laser receiver 17 thus run at least partly in the observation beam path 8. A transmitter prism system 35 is provided in order to couple the radiation emitted by the laser transmitter 16 into the observation beam path 8 in the direction of the objective 31. In addition, reflected laser radiation to the laser receiver 17 is decoupled from the observation beam path 8 by means of a receiver prism system 36. The transmitter prism system 35 and the receiver prism system 36 are preferably arranged between the objective 31 and the objective lens system and the lens reversing system 33 in the beam path 8.

In addition to the positioning and laterally correct representation of an image of a remote object shown as reversed in height and laterally in the objective-side, first intermediate image plane 32, the lens reversing system 33 also functions as a zoom system, by means of which the enlargement of the long-range optical device can be adjusted or varied. This setting of the enlargement is achieved by changing the scale of the image, by means of which the image produced by the objective 31 in the first intermediate image plane 32 is displayed in the second intermediate image plane 34. In addition, the lens reversing system 33 comprises a first movable lens 37 and a second movable lens 38, which can be displaced in axial direction. The lens reversing system 33 also comprises a field lens 39 at its objective-side end and a diverging lens 40 at its eyepiece side end, which are also involved in the depiction of the first intermediate image plane 32 in the second intermediate image plane 34. By means of said lens reversing system 33 functioning as a zoom system a zoom factor can be achieved with a value which preferably at least five.

The adjustment of the movable lenses 37, 38 is performed relative to the fixed lenses, the field lens 39 and the diverging lens 40, but also relative to one another, wherein the adjustment movements of the movable lenses 37, 38 are adjusted to one another such that the positions of the two intermediate image planes 32, 34 remain unchanged.

On the central tube of the telescopic sight according to FIG. 2 a power supply unit 22 with a battery 23 is also shown. On the eyepiece housing 2 operating elements 21 are also provided for inputting data or commands on a main control unit 14.

Figure 20:
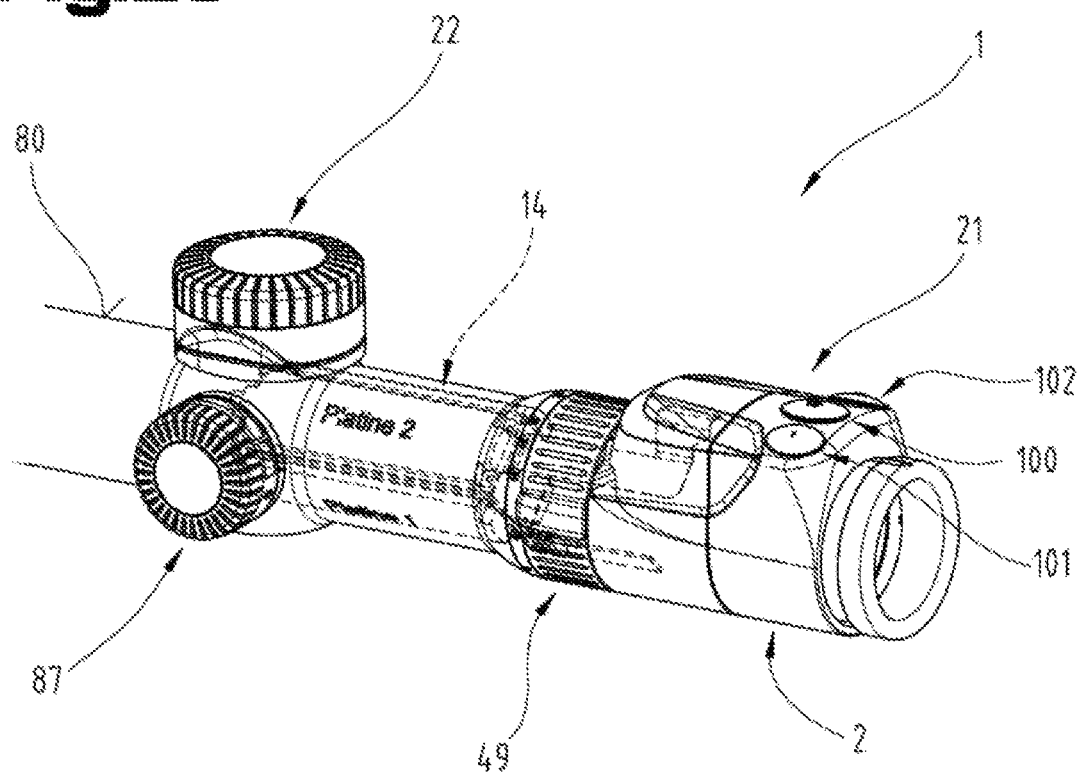
FIG. 20 is a detail of the long-range optical device according to FIGS. 1 and 2 with a portion of the central tube and the eyepiece housing.

The main control unit 14 is arranged in an area of the lens reversing system 33 on the inside of a central tube 80 of the long-range optical device 1. Electronic components, which form the main control unit 14, are thereby located in a radial intermediate space between the inner lens reversing system 33 and the inner circumference of the tube-like central tube 80. As indicated in FIG. 20 by dashed lines, the main control unit 14 comprises a plurality of assemblies of electronic components or circuit boards with electronic components. Said assemblies are arranged in the central tube 80 so as to surround the outer circumference of the lens reversing system 33. According to the example embodiment as shown in FIG. 20, the main control unit 14 comprises four such circuit boards with electronic components.

Figure 3:
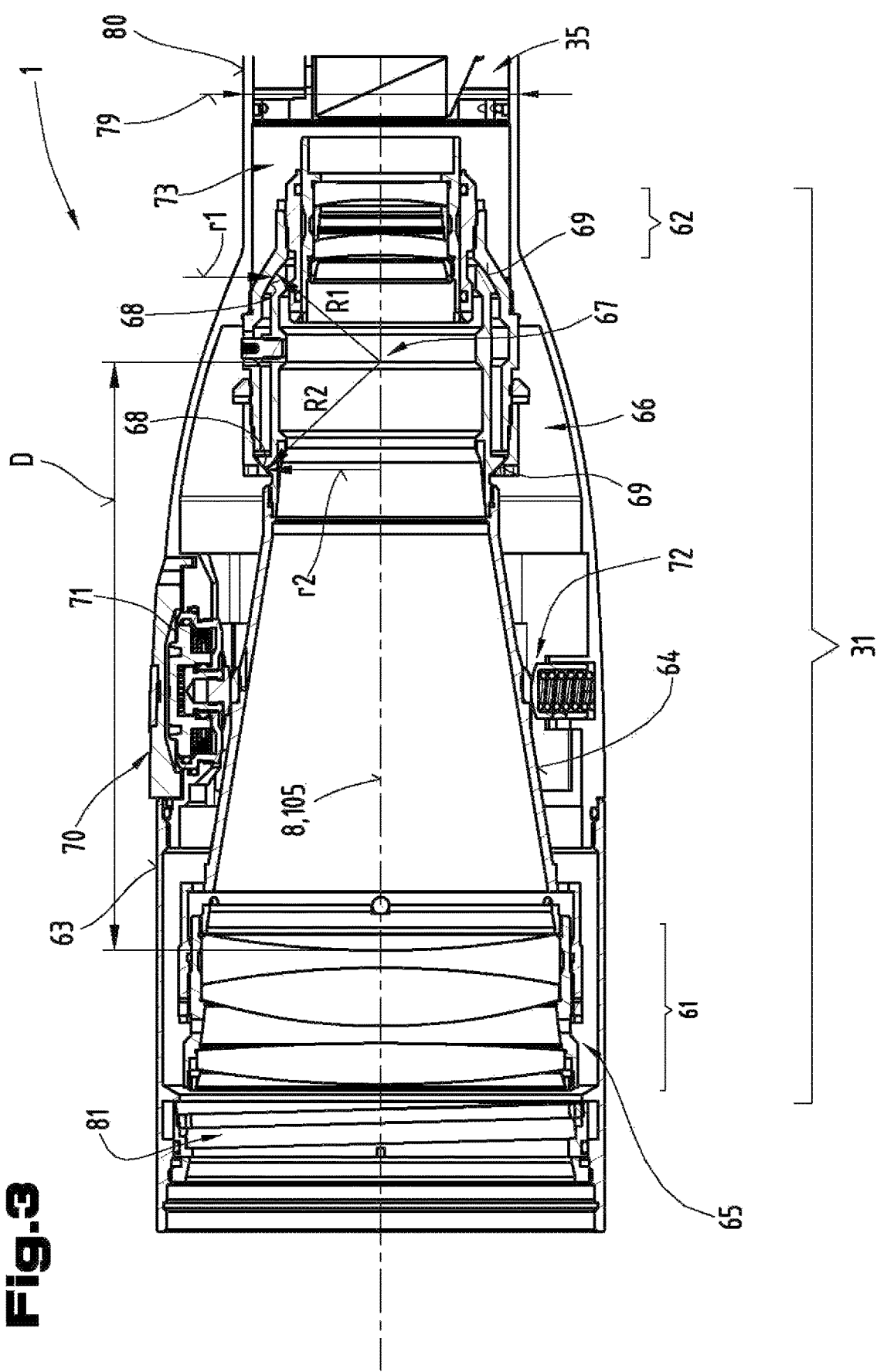
FIG. 3 is a detailed view of the longitudinal cross-section according to FIG. 2 with the objective.

FIG. 3 shows a detailed view of the longitudinal cross-section of the long-range optical device 1 with the objective 31 according to FIG. 2. As beam-deflecting elements and as display elements the objective 31 contains a front objective lens system 61 and a rear objective lens system 62.

The front objective lens system 61 and the rear objective lens system 62 are arranged in an objective housing 63. According to the invention at least the front objective lens system 61 is mounted movably or pivotably inside the objective housing 63. For this purpose on the inside of the objective housing 63 a lens tube 64 is arranged, on which the front objective lens system 61 is secured in a setting 65. At the eyepiece side end of the objective 31 a bearing housing 66 is fixed to the inside of the objective housing 63. Between an eyepiece side end of the lens tube 64 and the bearing housing 66 a joint is formed. The eyepiece side end of the lens tube 64 is designed here as an articular head, which is mounted pivotably in the bearing housing 66 forming an articular cavity. The joint formed between the bearing housing 66 and the lens tube 64 is preferably formed by a ball joint. In this way the front objective lens system 61 can be pivoted together with the lens tube 64 on the inside of the objective housing 63. The joint formed between the bearing housing 66 and the lens tube 64 comprises a pivot point 67 located on the optical axis 105 of the observation beam path 8. Bearing surfaces 68 in the bearing housing 66 and bearing surfaces 69 on the lens tube 64 are preferably designed as part surfaces of ball surfaces. According to this example embodiment the bearing surfaces 68, 69 are formed by so-called ball areas, i.e. the part surfaces extend between two delimiting circles, which are aligned perpendicular to the optical axis 105.

The eyepiece side end of the lens tube 64 has an inner cross-section and a free opening, the diameter of which is large enough so that the observation beam path 8 can pass as far as possible without any cross-sectional limitations through the rear objective lens system 62. Accordingly the bearing surfaces 68 of the bearing housing 66 and the bearing surfaces 69 on the lens tube 64 are designed to have suitable radii relative to the optical axis 105. Here a middle radius r1 of the eyepiece side bearing surface 68 can be smaller than a middle radius r2 of the bearing surface 69. By having the bearing surfaces 68, 69 formed by part surfaces of ball surfaces, the latter also have a radius relative to the pivot point 67. However, it is also possible that a ball radius R1 of the eyepiece side bearing surfaces 68, 69 and a ball radius R2 of the object-side bearing surfaces 68, 69 facing away from the eyepiece have different values.

It is advantageous if the ratio between the radius r2 and the ball radius R2 (of the object-side bearing surfaces 68, 69) is smaller than the ratio between the radius r1 and the ball radius R1 (of the eyepiece side bearing surfaces 68, 69). In this way the forces between the bearing surfaces 68, 69 caused by the recoil when releasing a shot can be absorbed and distributed more effectively. According to this example embodiment, in which the bearing surfaces 68 of the bearing housing 66 are formed by inner sides of ball part surfaces and the bearing surfaces 69 are formed on the lens tube 64 by outsides of ball part surfaces, particularly high pressure forces come from the thrust between the object-side bearing surfaces 68, 69. Preferably, the ball radii R1, R2 are greater than or at least the same size as half the diameter 79 of a central tube 80 of the telescopic sight. The term "central tube" is defined in the description of this example embodiment as an area of the outer housing of the long-range optical device, which extends between the eyepiece housing 2 and the objective housing 63 and is designed to be substantially cylindrical.

Lastly, the objective housing 63 also comprises an adjusting device 70 for the height adjustment and an adjusting device for lateral adjustment (not shown). By means of said adjusting devices 70 when focusing a firearm together with the telescopic sight 1 the position of the front objective lens system 61 or its alignment can be adjusted or determined in the objective housing 63. By means of such an adjustment in the described long-range optical device 1 the sight-line is aligned relative to the firearm so that the graticule or the target mark are moved into an position overlapping with the point of impact of a projectile used by the firearm. The adjusting device 70 also comprises on the one hand a threaded spindle 71 and on the other hand a spring-loaded pressure pin 72. The lens tube 64 is arranged between the threaded spindle 71 and the pressure pin 72 such that the resulting adjusting forces are directed perpendicular to the optical axis 105 on the lens tube 64. The adjusting device 70 is also arranged at a distance from the pivot point 67, the value of which is the same size as half the maximum distance of the pivot point 67 from the front objective lens system 61. In this way by adjusting the threaded spindle 71 the lens tube 64 can be pivoted about the pivot point 67 of the bearing housing 66 according to the height. The lateral adjustment functions in a similar way. By means of the adjusting device 70 for adjusting the height and the adjusting device for lateral adjustment the lens tube 64 can be adjusted by the front objective lens system 61 in a limited spatial angular range and is finally fixed. The two adjusting devices, i.e. the adjusting device 70 for the height adjustment and the adjusting device for the lateral adjustment each perform an adjustment in a direction perpendicular to the optical axis 105 of the long-range optical device 1. The adjustment movements of the height adjustment on the one hand and the lateral adjustment on the other hand are aligned to be perpendicular to one another.

Furthermore, it is also advantageous if the focal length f of the front objective lens system 61 is greater than the distance D of the pivot point 67 from the front objective lens system 61. According to this example embodiment the front objective lens system 61 has a focal length f with a value of 160 mm. The distance D of the pivot point 67 of the bearing housing 66 from the front objective lens system 61 has a value of 87.5 mm. It is advantageous if the ratio of the focal length f and the distance D has a value greater than 1. More advantageously the ratio of the focal length f and distance D is greater than 1.5. The pivot point 67 is thus on the object side in front of the focal point of the front objective lens system 61. Having a ratio of the focal length f and distance D which is greater than 1 is an advantage from a mechanical point of view in that in this way the bearing housing 66 can be arranged in an area of the objective housing 63 in which the latter has a structurally larger diameter than the diameter 79 of the central tube 80. With regard to the optical properties it can be assumed that the ratio between the focal length f of the front objective lens system 61 to the distance D of the pivot point 67 from the front objective lens system 61 is approximately the same as a ratio of an angle change of the sightline to the corresponding mechanical angle change of the pivoting of the front objective lens system 61. Accordingly a small change of angle when pivoting the front objective lens systems 61 causes a much greater angular change or adjustment of the direction of the sight line of the long-range optical device 1 overall.

In addition to the formation of an articular cavity for the lens tube 64 with the front objective lens system 61 the bearing housing 66 also comprises at an eyepiece side end a linear guide for a setting 73 of the rear objective lens systems 62. The setting 73 for the rear objective lens system 62 is designed like the linear guide mounting said setting 73 to be substantially cylindrical and allows the displacement of the rear objective lens system 62 parallel to the optical axis 105, i.e. parallel to the longitudinal extension of the long-range optical device 1. The rear objective lens system 62 can thus be used for focusing the observation beam path 8 or for parallax equalization. For this an adjusting ring not shown in FIG. 3 is connected mechanically to the setting 73 of the rear objective lens system 62.

Figure 19:
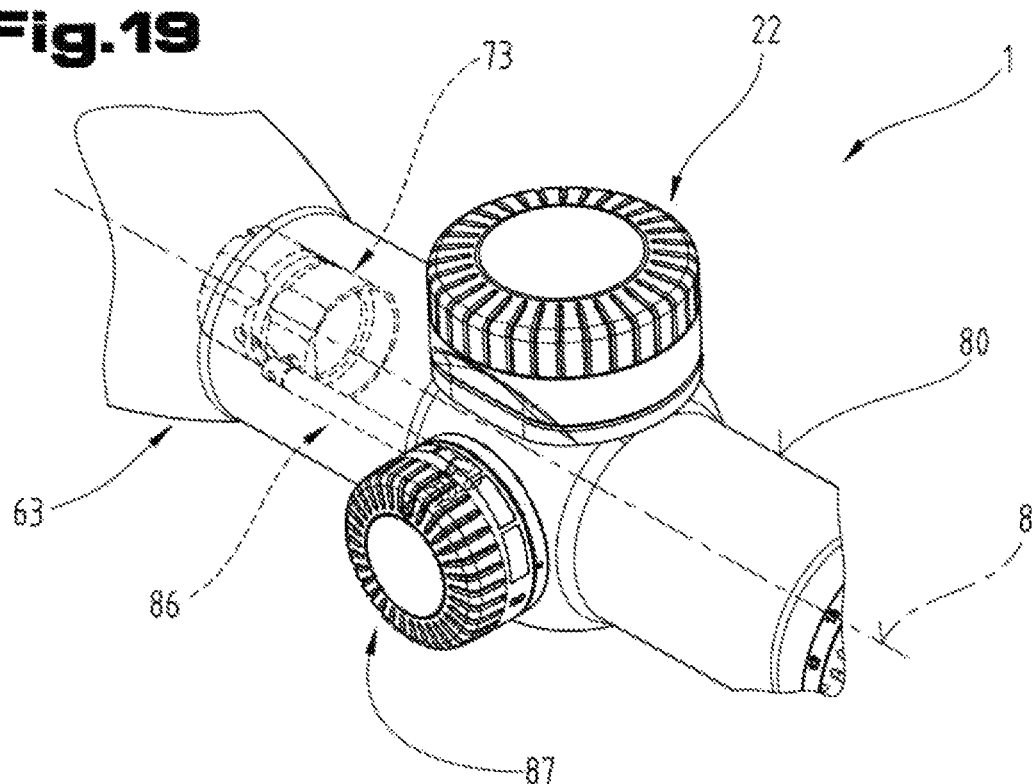
FIG. 19 is a detail of the long-range optical device according to FIGS. 1 and 2 with a focusing device, shown in a perspective view.

FIG. 19 shows a detail of the long-range optical device 1 according to FIG. 1 or 2 in perspective view. In this way the mechanism of the focusing device is shown by dashed lines showing the corresponding components. The setting 73 of the rear objective lens system 62 is connected mechanically by a rod 86 to an adjusting ring or to a parallax button 87.

Figure 4:
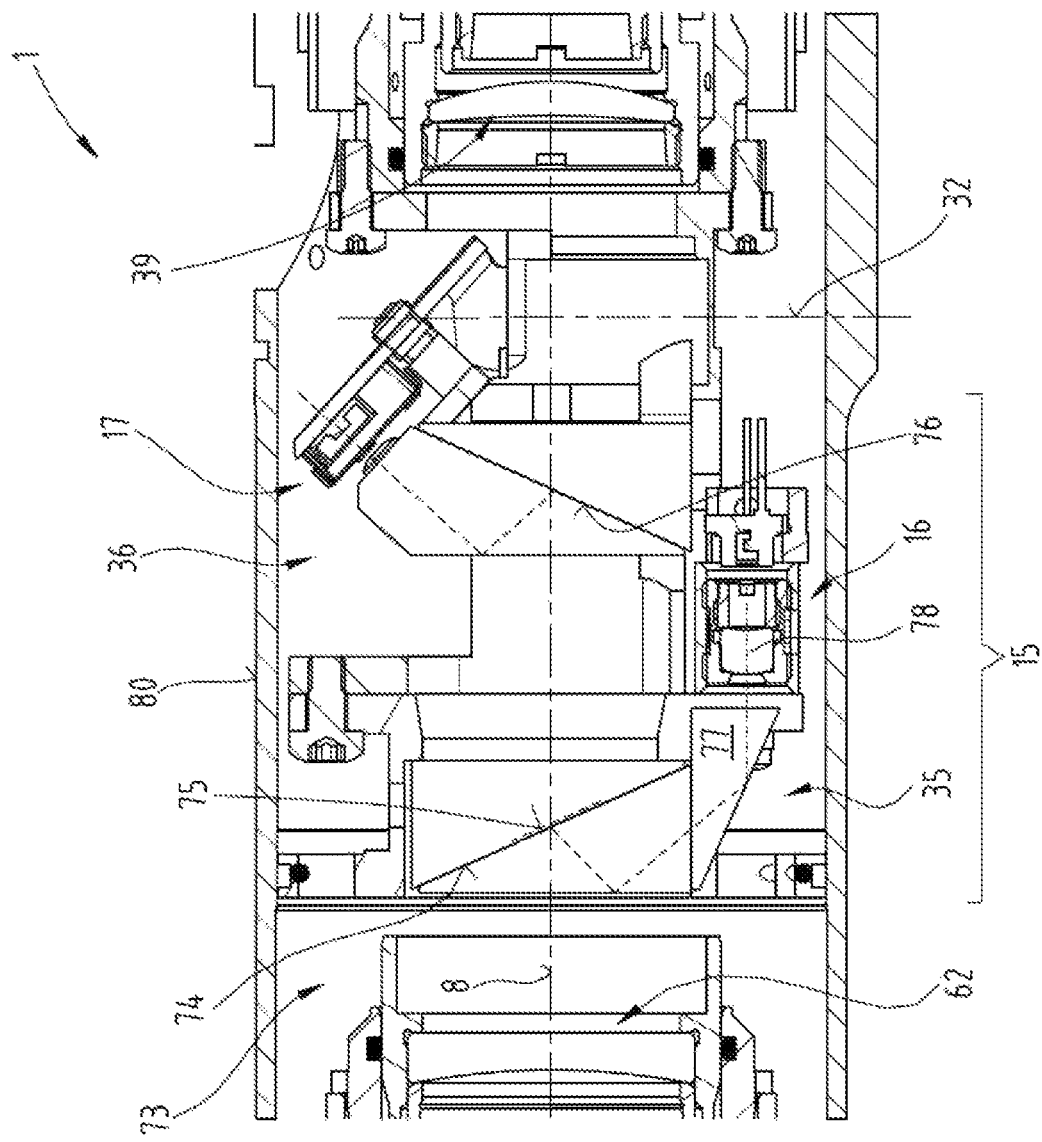
FIG. 4 is a detailed view of the longitudinal cross-section according to FIG. 2 with the laser range finder.

FIG. 4 shows a longitudinal cross-section of the long-range optical device 1 as a detail of FIG. 2 with the rangefinder 15. For coupling the light emitted by the laser transmitter 16 into the observation beam path 8 on an inner interface 74 of the transmitter prism system 35 an area 75 is provided with a dichroic coating. At said dichroic coating light is reflected selectively only in the wavelength corresponding to the light of the laser transmitter 16. Said dichroic coating area 75 is designed to be approximately circular. The laser light of the laser transmitter 16 sent to a remote object is limited accordingly to a restricted spatial angular area.

The decoupling of laser light, which has been reflected by the remote object, to the laser receiver 17 is performed on an interface 76 of the receiver prism system 36. Said interface 76 is also formed by a dichroic coating. For passing the transmitter prism system 35 laser light reflected back by the remote object is available to the area not coated on the interface 74 of the transmitter prism system 35, i.e. the region surrounding area 75.

As already explained above with reference to the description of the figures of FIG. 3, the objective 31 or its front objective lens system 61 is mounted pivotably in the objective housing 63. In order to seal the inner chamber of the long-range optical device or the housing 63 in a gas-tight manner, the object-side opening of the long-range optical device 1 is provided with a cover glass 81. The cover glass 81 is preferably in an oblique position relative to the longitudinal extension of the long-range optical device 1 or relative to the optical axis 105. This means that a surface normal on one of the planar parallel surfaces of the cover glass 81 is inclined relative to the optical axis 105. Preferably, the surface normal of the cover glass 81 forms an angle with a value of between 0.5° and 2°. In this way disruptions in the detection of laser radiation at the laser receiver 17 are kept as low as possible by radiation portions reflected by the cover glass 81 of the primary laser beam emitted by the laser transmitter 16.

A laser diode is provided as a laser transmitter 16. The wavelength of the laser transmitter is preferably selected from the infrared range, in particular with a wavelength of 905 nm. For introducing the laser light of the laser transmitter 16 into the transmitter prism system 35 on the latter a deflecting prism 77 is arranged, wherein a transmitter lens 78 is provided between the laser transmitter 16 and the deflecting prism 77 or the laser transmitter 16 and the transmitter prism system 35. Said transmitter lens 78 is formed by a converging lens, whereby advantageously the structural length of the arrangement of the laser transmitter 16 can be shortened accordingly together with the transmitter prism system 35.

Both for the position of the laser transmitter 16 or the corresponding laser diode and for the position of the laser receiver 17 it is possible for the latter to be located virtually in the first intermediate image plane 32. In this way the observation beam path 8 and also the beam paths of the laser transmitter 16 and the laser receiver 17 can be focused jointly by adjusting the rear objective lens system 62.

Figure 5:
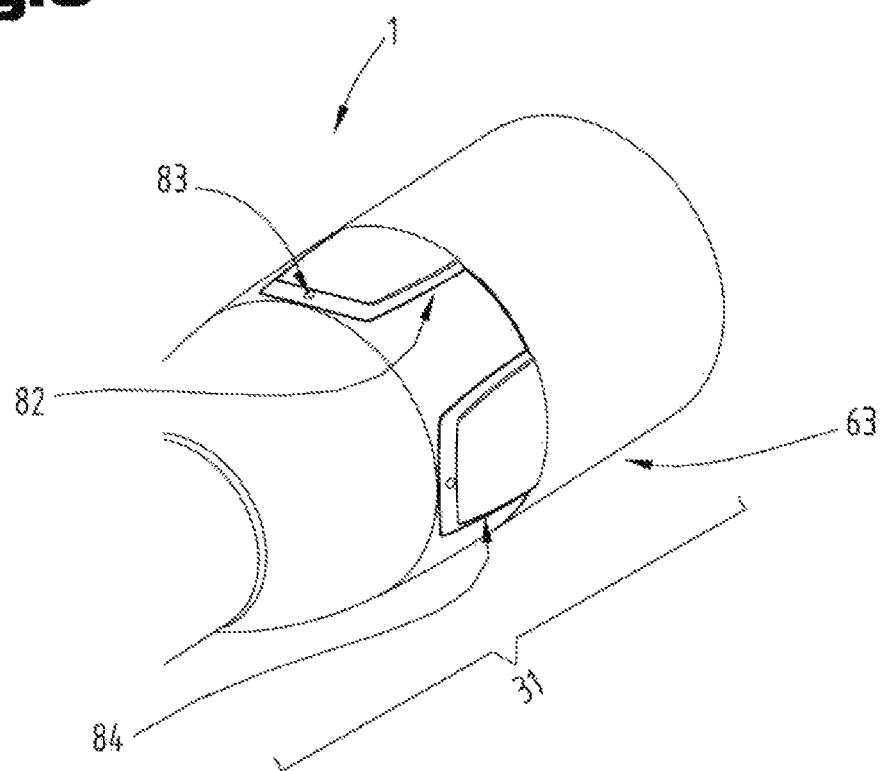
FIG. 5 is a detail of the objective housing in perspective view.
Figure 6:
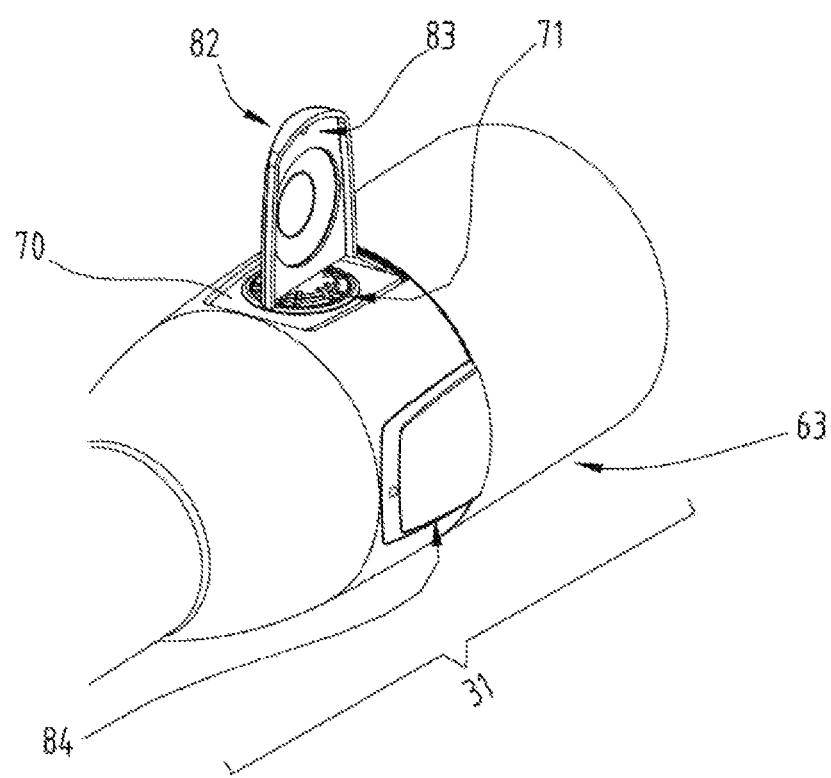
FIG. 6 is the objective housing according to FIG. 5 with a removed cover.

With reference to FIGS. 5 and 6 the alignment and adjustment of the lens tube 64 with the front objective lens system 61 of the objective 31 is described in the following. Here the figures show respectively a perspective external view of the objective housing 63 of the long-range optical device 1 or telescopic sight according to FIG. 2. As already explained above with reference to FIG. 3, the setting and adjustment of the lens tubes 64 with the front objective lens system 61 on the inside of the objective housing 63 by means of the adjusting device 70 is performed by height. This adjustment and pivoting of the lens tubes 64 can be performed by a user by manually rotating the threaded spindle 71. According to this example embodiment the threaded spindle 71 is arranged sunk below the external contour of the objective housing 63. In addition—as shown in FIG. 5—the threaded spindle 61 or the access to the threaded spindle 61 is closed by a cover 82 so that the external contour of the objective housing 63 seems to be supplemented evenly by the cover 82. The cover 82 is also designed so that—as shown in FIG. 6—it can be used as a tool for operating the threaded spindle 71. The cover 82 also comprises a lock 83 by means of which the cover 82 can be fixed securely to the objective housing 63. In a similar manner as with the adjusting device 70 for the height adjustment or the threaded spindle 71 thereof a cover 84 is also provided for the adjusting device for lateral adjustment.

Figure 7:
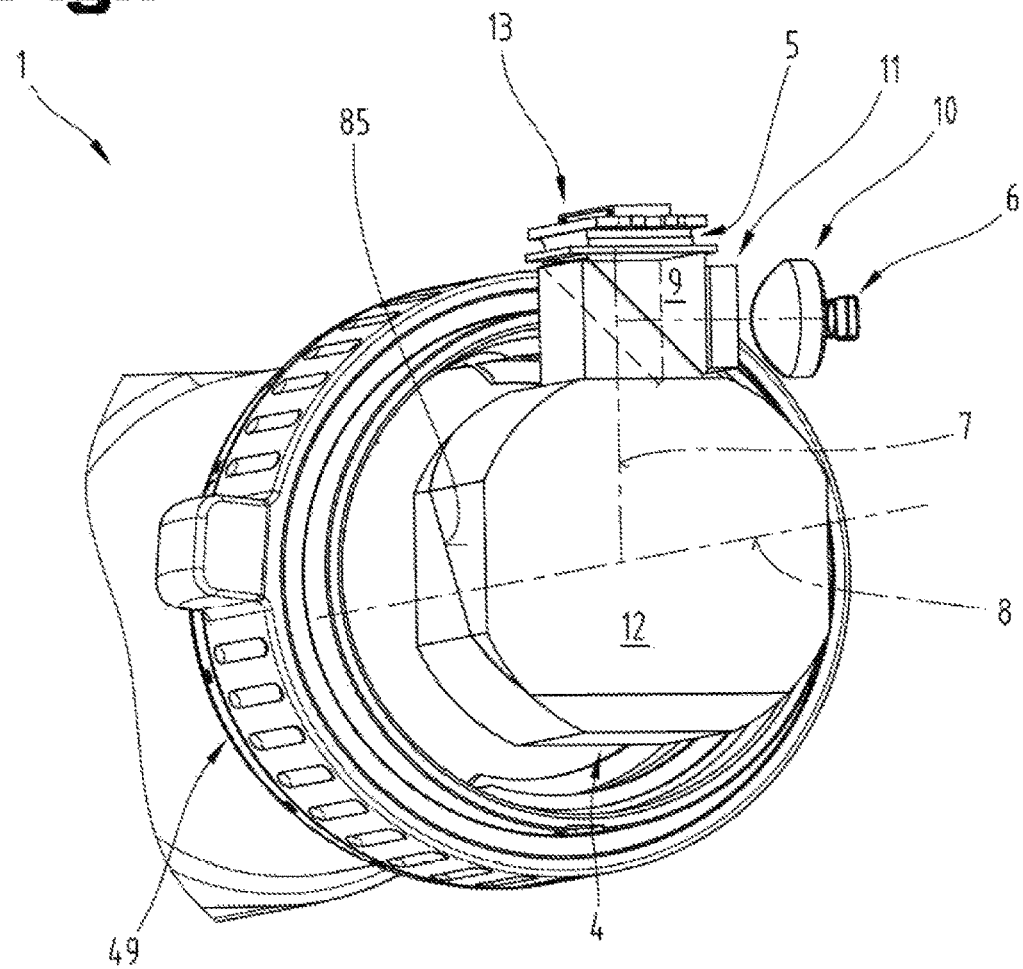
FIG. 7 is a detail of the long-range optical device according to FIG. 1 with a display device.

FIG. 7 shows a detail of the long-range optical device 1 according to FIG. 1 partly disassembled. Here the eyepiece housing 2 and also the eyepiece 3 have been removed from the eyepiece side end of the long-range optical device 1 and a display device 4 can be seen. Said display device 4 comprises as its primary components a LCoS display 5 (LCoS=Liquid Cristal on Silicon) and a light source 6 for illuminating the LCoS display 5. An image produced on the LCoS display 5 is transmitted via a display beam path 7 into an observation beam path 8 of the long-range optical device 1 and can be seen by an observer through the eyepiece 3.

To illuminate the LCoS display 5 with the light source 6 its light is reflected by an illuminating prism 9 to the LCoS display 5, where it is firstly focused by an illuminating lens 10 and polarized by a polarizer 11. Light reflected by the LCoS display 5 passes through the illuminating prism 9 into a display prism 12, through which it is merged with the light of the observation beam path 8 and reflected to the eyepiece 3. Both the illuminating prism 9 and the display prism 12 are designed in the form of a beam splitter cube. The illuminating prism 9 and the display prism 12 are polarizing and have a polarizing effect on the passing light. The light of the light source 6 is thus guided through the polarizer 11 and directed after deflection through the illuminating prism 9 to the LCoS display 5, where liquid crystal molecules for electric voltage are aligned so that the light is reflected with the desired brightness. The alignment of the liquid crystal molecules required for producing an image on the LCoS display 5 is performed by a display control 13.

Figure 8:
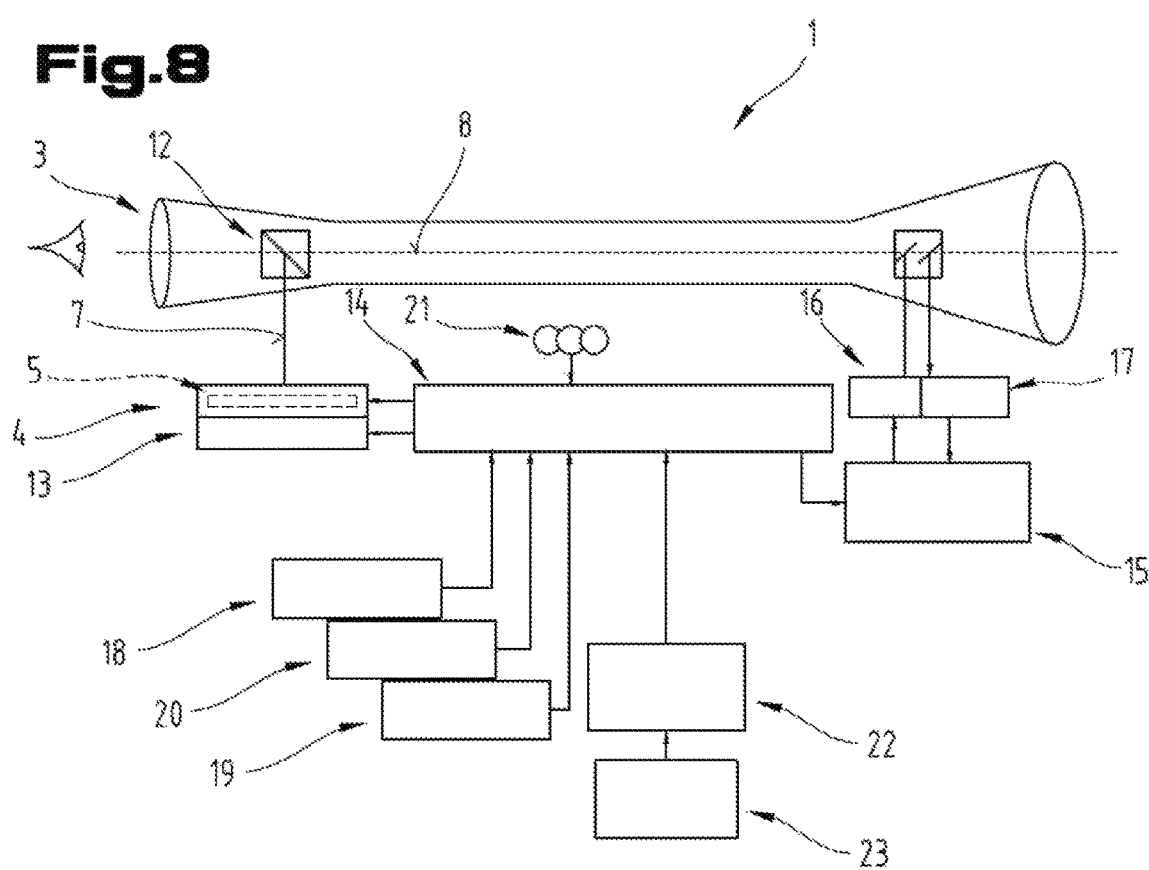
FIG. 8 is a block diagram of the control of the long-range optical device.

FIG. 8 shows a block diagram of the control of the long-range optical device 1. The long-range optical device 1 designed in the form of a telescope according to this example embodiment comprises in addition to the display device 4 a main control unit 14 and as additional devices a rangefinder 15 with a laser transmitter 16 and a laser receiver 17 as well as an inclination sensor 18, a temperature sensor 19 and a zoom sensor 20 for measuring the current enlargement setting of the telescope. To influence the mode of operation of the control of the long-range optical device 1 also operating elements 21 are provided. A power supply unit 22 is preferably supplied by a battery 23 according to this example embodiment.

Figure 9:
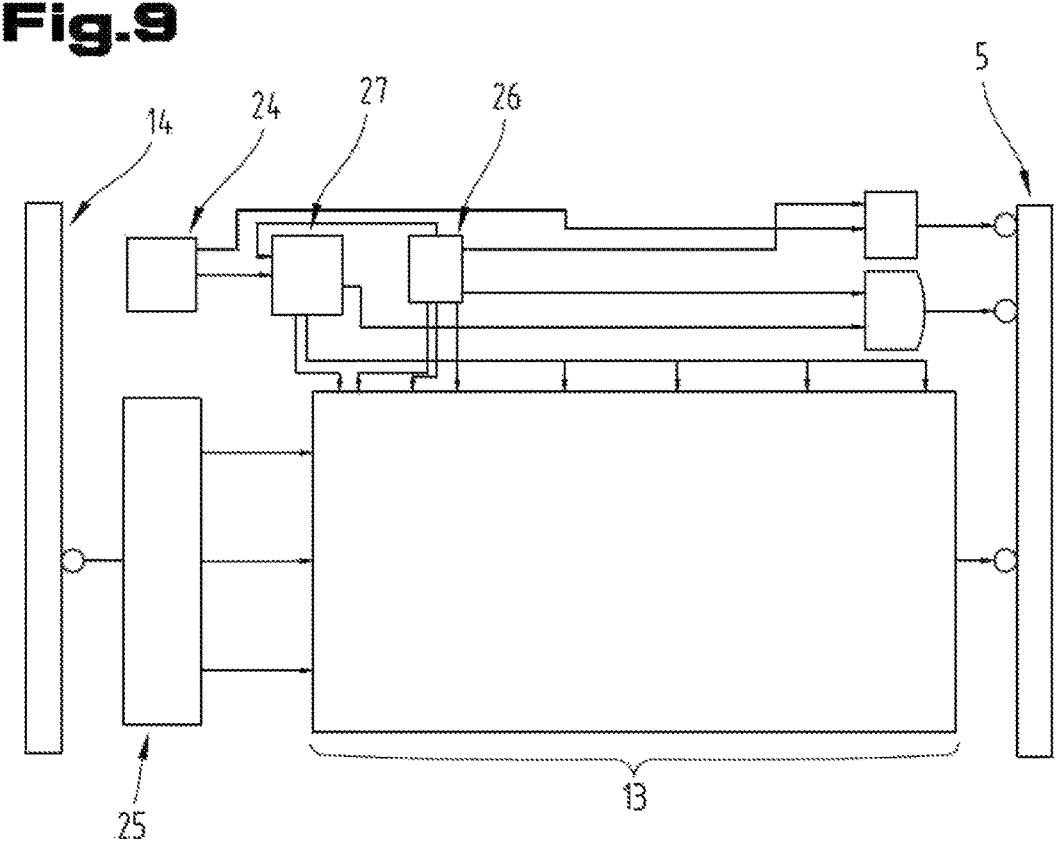
FIG. 9 is a detail of the control and the display device according to FIG. 8.

FIG. 9 shows a detail according to FIG. 8 for illustrating the generation of an image on the display device 4 with the main control unit 14, the display control 13 and the LCoS display 5. The timing or the time sequence of the control of individual pixels on the LCoS display 5 is determined by a clock generator 24. For transmitting images to be shown on the LCoS display 5 image information data is transmitted from the main control unit 14 by means of a bus system 25. The bus system 25 is preferably formed by a so-called Serial Peripheral Interface (SPI). The image information data for producing individual image points on the LCoS display 5 is performed in the display control 13. Preferably with each rising and each descending flank of the clock generator 24 respectively four image points of the LCoS display 5 are controlled simultaneously.

The display control 13 is preferably formed by an integrated circuit in the form of a so-called Field Programmable Gate Area (FPGA). The image information data of an image to be represented are read by the display control 13 via the bus system 25 and structured or reordered, so that the image points can be output serially on the LCoS display 5 line for line. For this a gap counter 26 and a line counter 27 work together with the display control 13 in addition to the clock generator 24.

Without limiting the broader view, it should also be assumed in the following that the LCoS display 5 comprises a number of image points of 600 lines to 800 image point or gaps. By clocking the display control 13 with the clock generator 24 or the gap counter 26 and the line counter 27 it is possible that the image points or pixels of the LCoS display 5 are controlled respectively by the corresponding image information of an image to be displayed. Here the gap counter 26 ensures that by increasing the value of the counter consecutive image points of the LCoS display 5 are controlled within a line consecutively by image information data. As soon as the gap counter 26 has reached the maximum possible number of image points per line—in this example embodiment 800 image points—the status of the line counter 27 is incremented and the gap counter 26 is set back to zero and then a further line of image information data can be output. When finally the line counter 27 has also reached its maximum possible number of lines—in this example embodiment 600—the line counter 27 is also reset to zero and the output can be continued with a new image writing sequence.

Figure 10:
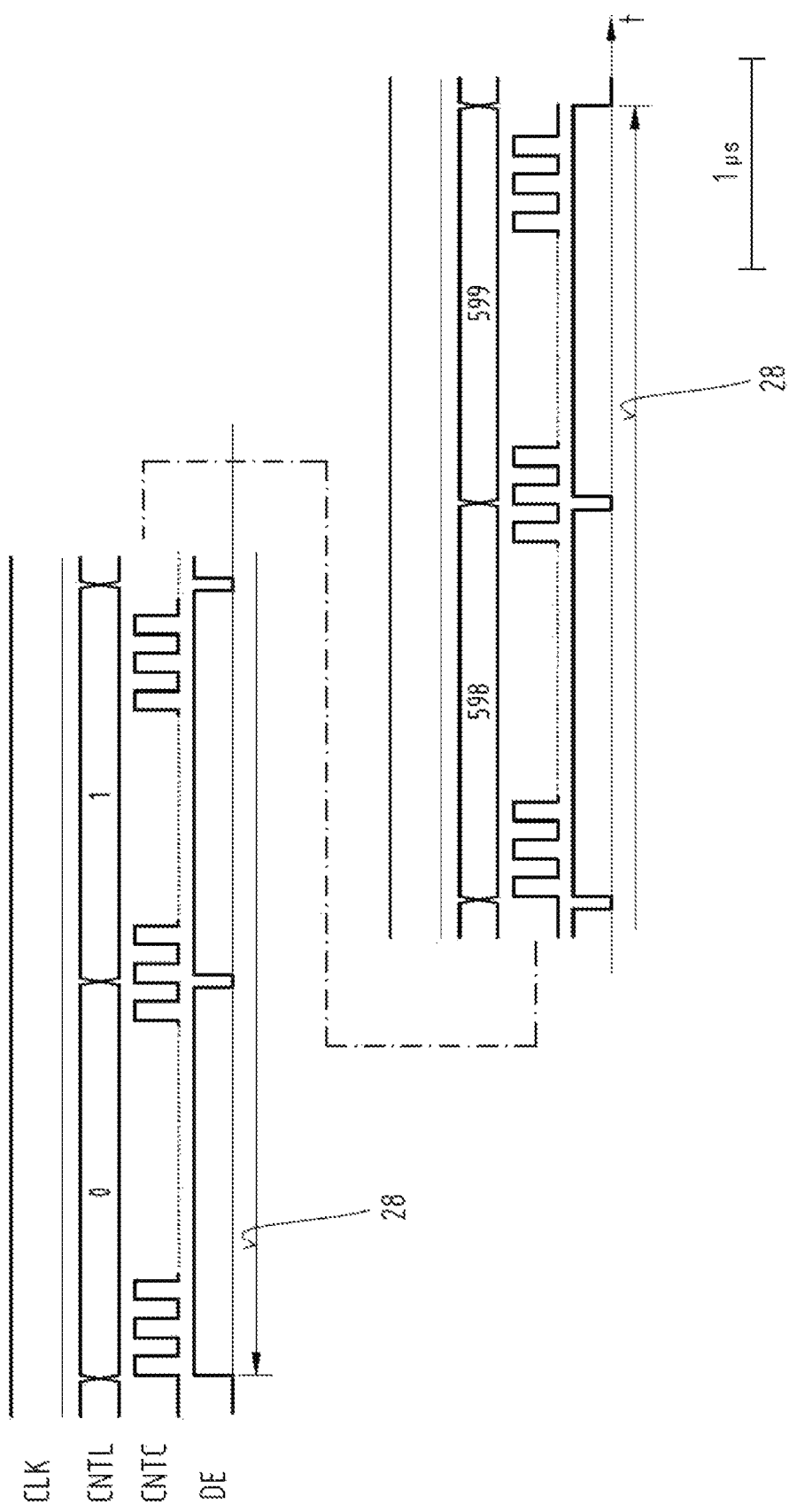
FIG. 10 is a time chart of the sequence of the output of image information data.

FIG. 10 shows a time chart for illustrating the output of image information data or the control of the LCoS display 5 for producing a single complete image. The abbreviations used in FIG. 10 represent control signals or clock signals by means of which the image generation on the LCoS display 5 is controlled. "CLK" is thus the basic timed sequence as defined by the clock generator 24 (FIG. 9). "CNTL" denotes the number of the line of the LCoS display 5 in which at the corresponding moment image information data is output. "CNTC" represents the gas within a line of image points. The abbreviation "DE" denotes the image release signal, by means of which the output of image information data at output registers of the display control 13 can be released or blocked. According to the line numbers "CNTL" of 0 to 599 FIG. 10 shows an image writing sequence 28 of a single complete image with 600 lines per 800 points (gaps; CNTC).

Commercial or standard LCoS displays 5 have a basic timed sequence of the clock generator 24 of typically 41 MHz and an image alternating frequency of 480 Hz. For the conventional use of LCoS display 5 in video projectors relatively high image repeat frequencies are desirable to avoid flickering and jerking. In this case also special sequences of sequential color images are used, for example 8 consecutive images of different colours, so that an image repeat frequency is produced for a complete color image of 60 Hz. An example of such an image sequence is "RRGGBBGG" with R=red, G=green and B=blue. The image writing sequence 28 for an individual image of a single color thus has a period TB of about 2 ms. To reproduce a film with a video projector the output of image information data to the LCoS display 5 is performed by a immediately consecutive image writing sequences 28.

Figure 11:
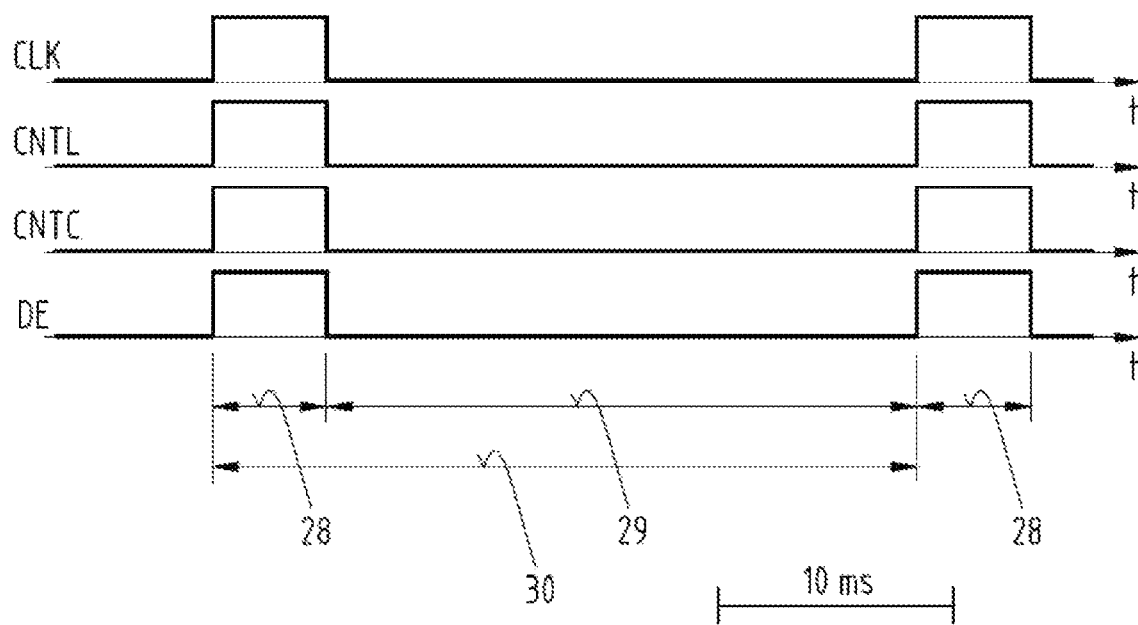
FIG. 11 is an example embodiment of the mode of operation of the display device of the long-range optical device.

According to a first embodiment of a long-range optical device 1 according to the invention the output of image information data to the LCoS display 5 is interrupted at least for a period TP of an interval 29. FIG. 11 shows a first example of such a mode of operation of the control of the LCoS display 5, illustrated by a time chart of the already mentioned control signals. The length or period TP of the interval 29 is greater than or at least the same as the period TB of an image writing sequence 28. The control of the image points of the LCoS display 5 is thus performed by a sequence of image cycles 30 of length TW. The period TW of the image cycle 30 is thus greater than or at least equal to twice the value of the length TB of the image writing sequence 28. This mode of operation can be achieved in that for the period TP of the interval 29 at least the image release signal DE is set to zero. In this way advantageously it is possible for the power consumption of the display device 4 to be kept low.

According to preferred embodiment variants of the mode of operation of the long-range optical device 1 for the period TP of the interval 29 further components of the display device 4, such as the gap counter 26, the line counter 27 and also the clock generator 24 are also switched to be currentless.

According to a further advantageous embodiment variant the LCoS display 5 is operated by the display control 13 for the monochromatic display of image contents. In this way the period TB of the image writing sequence 28 can be kept suitably short.

According to a particularly preferred mode of operation of the display control 13 and the LCoS display 5, the period TW of the image cycle 30 is selected from a range of 60 ms to 120 ms.

Thus for the period TP of the interval 29 both the control signals CNTL and CNTC of the line counter 27 or the gap counter 26 (FIG. 10) as well as the basic timed sequence CLK of the clock generator 24 are switched off. It has been shown that, even with a relatively high value for the period TW of the image cycle 30 of up to 120 ms, it is not possible to notice any fading of the display of images on the LCoS display 5 or a flickering of the display. This relates in particular to the display of static image information. This can be for example the display of the value of the temperature measured by the temperature sensor 19 or the value of the distance of an object measured by the rangefinder 15 after completing the measurement and evaluation on the LCoS display 5. The representation according to the letters and numbers on the LCoS display 5 or the shown image shows practically no rapid change. Even with a display of the value of the inclination of a firearm, measured by the inclination sensor 18, a relatively larger value TW of the image cycle 30 is not perceived by the user to be in any way distracting.

According to a preferred method for the mode of operation of the control of the long-range optical device 1, the period TW of the image cycle 30 for controlling the LCoS display 5 has to be adapted dynamically according to operating states with the use of the long-range optical device 1. For this for the control of the display device 4 an "idle mode" or "persistence mode" are provided on the one hand and a "changeover mode" or "transience mode" are provided on the other hand. In the idle mode in which only a static image or corresponding image information is be shown by the display device 4 on the LCoS display 5 a first period TW 1 of the image cycle 30 is provided from a range of 60 ms to 120 ms for the control of the LCoS display 5. If changes occur in the operating states of the long-range optical device 1, which can cause a change in the image information to be shown, the mode of operation of the display device 4 is placed temporarily into the changeover mode, in that the period TW of the image cycle 30 is reduced to a second value TW 2 of less than 50 ms. For the duration of a predefinable latency period in which a change in the image information data which has to be shown finally on the LCoS display 5 is expected, the mode of operation of the display device 4 remains in this changeover mode. Accordingly, the representation of the image information data on the LCoS display 5 follows with a much higher frequency, namely at a frequency of 20 Hz or more than 20 Hz. In this way images can also be still seen by the observer as mostly continually variable even in phases of rapid change of image information data. It is thus possible to effectively avoid the flickering or jerkiness of images.

Such a transition of the mode of operation of the long-range optical device from an idle mode to the changeover mode can be triggered by various events, which can be registered by the main control unit 14. Thus for example such a transition to the changeover mode of the display device 4 is initiated by activating the operating element 21 to trigger a measurement process by the rangefinder 15. For the time required to carry out the measurement, the evaluation of the measurement and the output of the determined value of the measured distance at the LCoS display 5, the display device 4 remains in the changeover mode with the period TW 2 of the image cycle 30 which is equal to or less than 50 ms. Once the measurement of the distance and its display has been completed and no further change has been registered by the main control unit 14 of the long-range optical device, the display device 4 is returned from the changeover mode back to the idle mode. This means that the duration of the image cycle 30 is increased back to TW 1 (from for example 100 ms).

Similar to the change of the mode of operation of the display device 4 from the idle mode to the changeover mode and back to the idle mode, as can be initiated by triggering a distance measurement by activating the operating element 21, according to one development of the long-range optical device by means of the main control unit 14 other events can function as triggers. In addition it is possible for example that in the main control unit 14 the monitoring of the zoom sensor 20, the inclination sensor 18, the temperature sensor 19 or also other possible measurement devices of the long-range optical device can be monitored for changes in corresponding measurement variables. After determining such an event in the main control unit 14, which makes it necessary to redefine the image information data to be represented on the LCoS display 5, the mode of operation of the display device 4 is transferred from the idle mode to the changeover mode with the correspondingly higher image repetition frequency or image repetition rate and after a preselected latency period the operating state of the display device 4 is returned back from the changeover mode to the idle mode.

The redefinition of the image information data to be displayed with a temporary change of the mode of operation of the display device 4 between the idle mode and changeover mode is a particular advantage if, at least on the basis of the distance measured by the rangefinder 15 and the inclination of the firearm measured by the inclination sensor 18, there is recalculation of the image information data necessary for displaying a cross hair or a graticule. This is the case if the long-range optical device 1 or its main control unit 14 has an integrated ballistics computer. If in connection with the movements of the firearm when aiming at a target there is a change in the inclination measured by the inclination sensor 18, a recalculation of the image information to be displayed for showing the variable cross hair is performed continuously. For the user of the long-range optical device 1 it is thus particularly desirable in such a case to be able to see the movement of the cross hair as varying continually and constantly. This is achieved by the higher image repetition frequency or the shorter image cycle 30 (TW 2) for representing corresponding images on the LCoS display 5.

In addition to the already mentioned option for the mode of operation of the display device 4 a simple monochromatic representation is provided, it is also an advantage to completely omit the representation of grey tones when generating the image points on the LCoS display 5 or to limit the representation of grey tones to only a minimum. In this way the number of data lines necessary for transmitting the image information data can be reduced accordingly between the display control 13 and the LCoS display 5. This also has the advantage that the power requirement or power consumption of the display device 4 or the control electronics of the long-range optical device 1 can be kept at a suitably low level.

Although in the above description of the invention a telescopic sight has been taken as the long-range optical device 1, the invention can also be advantageous in other long-range optical devices, such as binoculars, telescopes or rangefinders.

Figure 12:
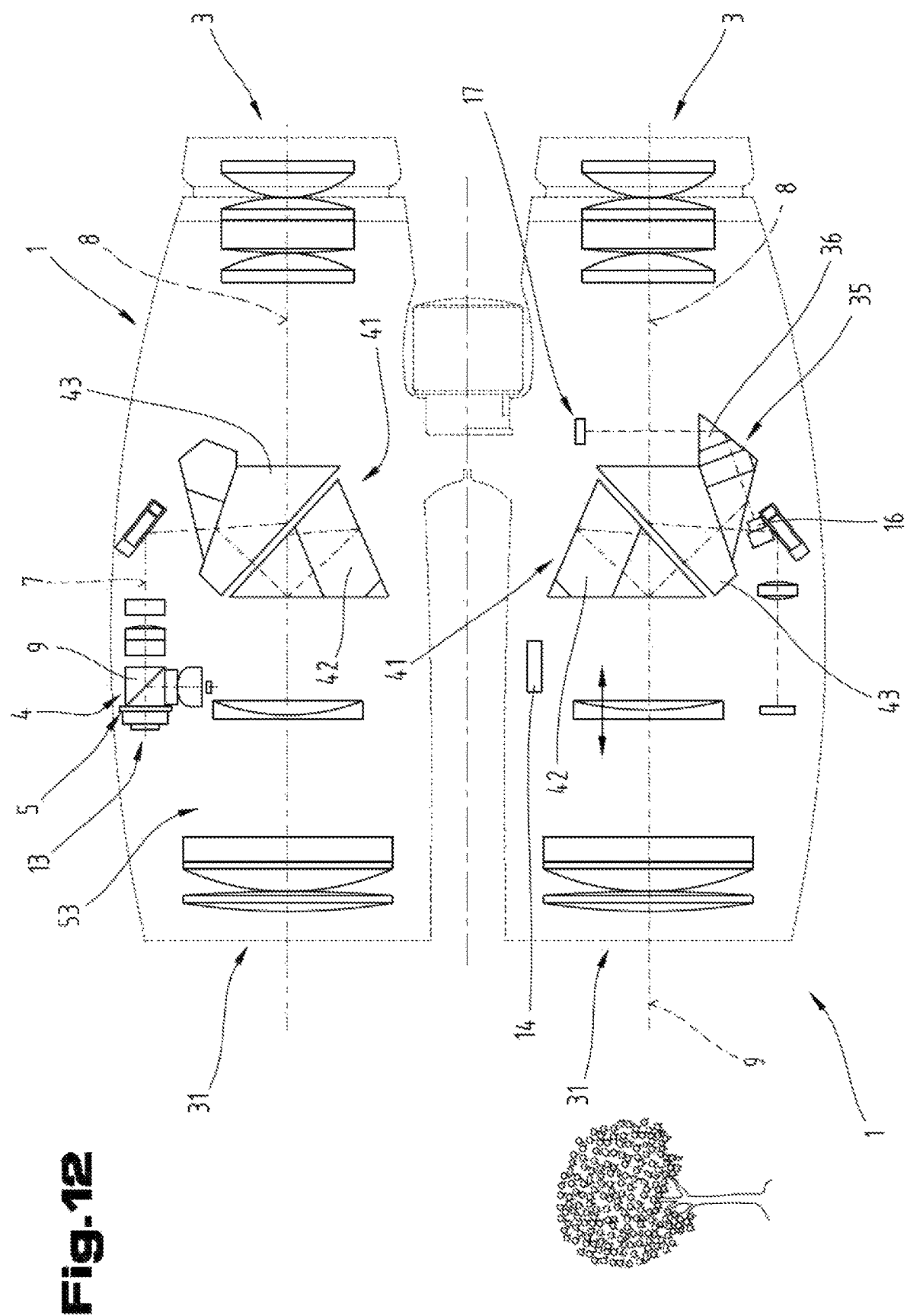
FIG. 12 is an example embodiment of the long-range optical device in the form of field glasses.

FIG. 12 shows field glasses or binoculars as a further example embodiment of the long-range optical device 1. The field glasses have two observation beam paths 8 which each run through the objective 31 and the eyepiece 3. Both observation beam paths 8 also comprise a prism reversing system 41 with a roof prism 42 and a deflecting prism 43. The laser rangefinder of said field glasses is formed by the arrangement of the laser transmitter 16 and the laser receiver 17 in one of the two beam paths 8. For this the prism system formed by the transmitter prism system 35 and the receiver prism system 36 is arranged on the deflecting prism 43 such that the outgoing beams of the laser transmitter 16 are coupled into the observation beam path 8 and the reflected laser beams can be decoupled from the observation beam path 8 in order to be detected by the laser receiver 17.

Whereas the laser rangefinder is arranged in one of the two tubes of the field glasses, the display device 4 with the LCoS display 5 is provided in the other tube. The light coming from the LCoS display 5 runs through the illuminating prism 9 and after coupling into the observation beam path 8 in the direction of the eyepiece 3. The coupling is formed at an interface of the deflecting prism 43 of the prism reversing system 41. In the second observation beam path 8 thus the display shown on the LCoS display 5 is superimposed over the image of the remote object. Thus for example the result of a distance measured by means of the laser transmitter 16 and the laser receiver 17 after being calculated in the main control unit 14 (FIG. 8, 9) by means of the display device 4 can be displayed to the user in the field of vision of one observation beam path 8.

Figure 13:
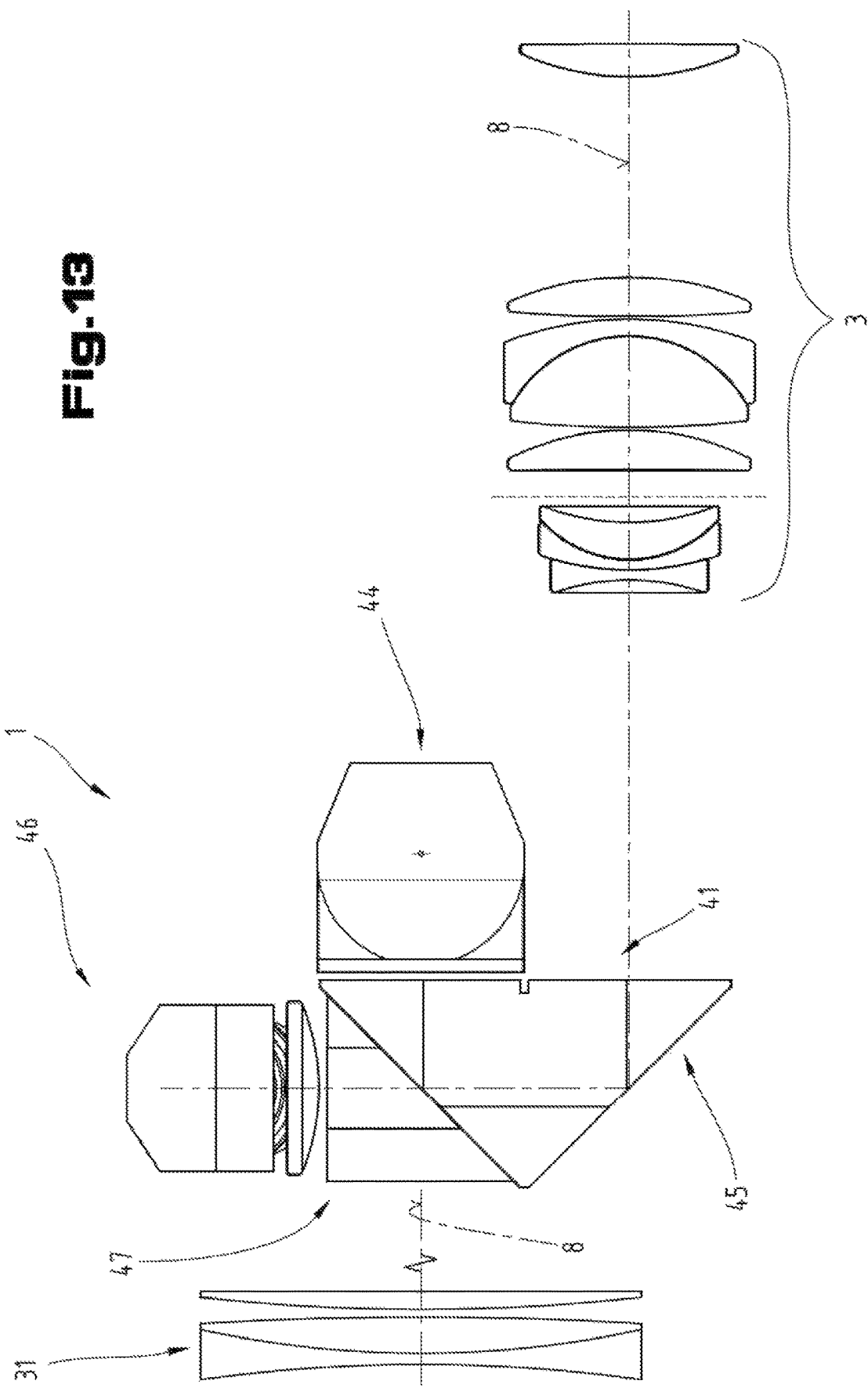
FIG. 13 is an example embodiment of the long-range optical device in the form of a telescope in longitudinal cross-section.
Figure 14:
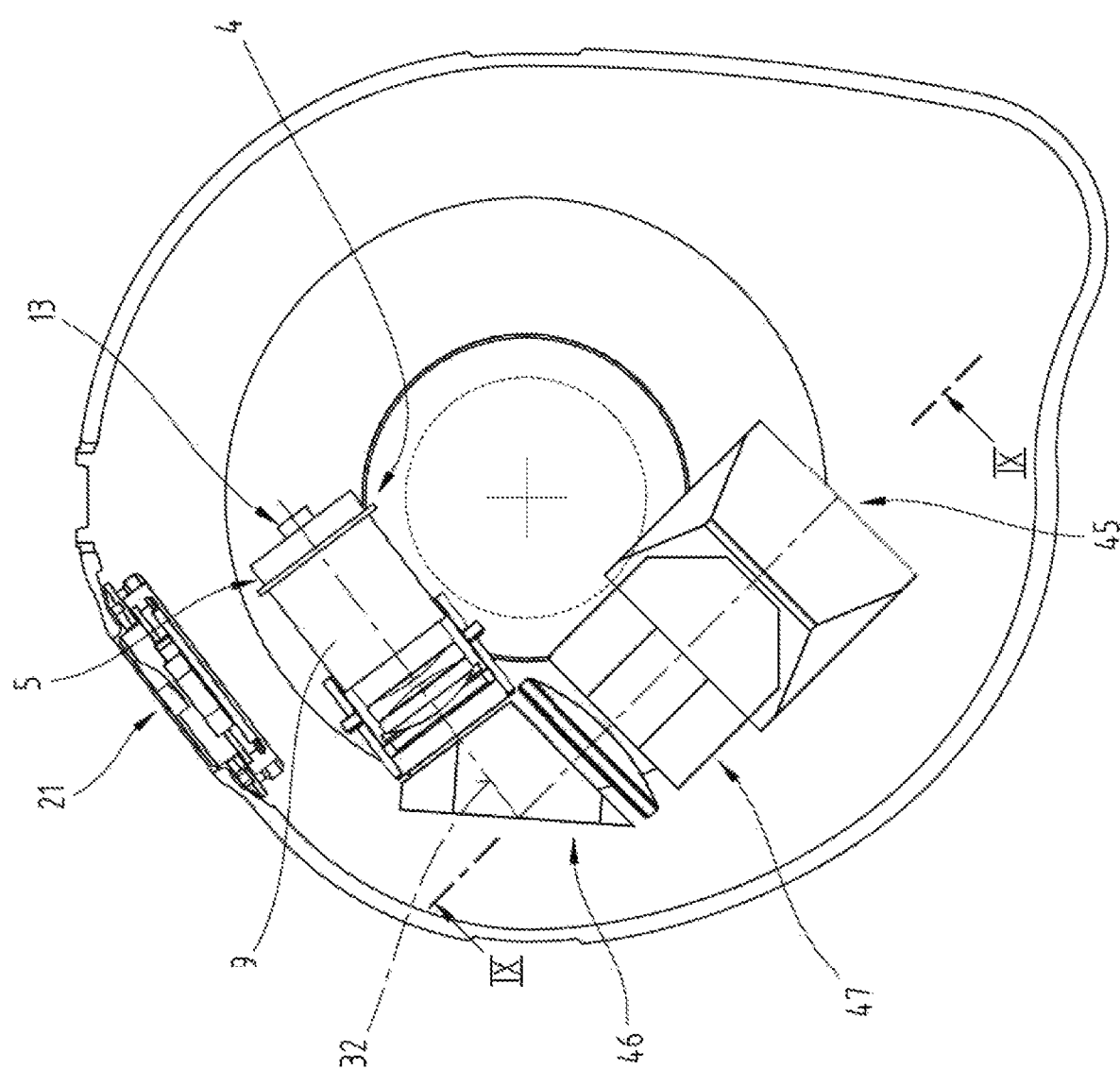
FIG. 14 is a cross-section of the telescope according to FIG. 13.

FIGS. 13 and 14 show a telescope as a third example embodiment of a long-range optical device 1. The latter is a monocular observation telescope with only one observation beam path 8. For straightening and correctly representing the image produced by the objective 31 the prism reversing system 41 is used which is formed by a Porro prism system of the first kind. The prism reversing system 41 thus comprises a first deflecting prism 44 and a similarly designed second deflecting prism 45. The telescope also comprises the display device 4 formed by a LCoS display 5. The light beams of the image produced by the display device 4 pass after deflection by a display prism 46 through a coupling prism 47 and are coupled by means of the latter to an interface of the second deflecting prism 45 in the observation beam path 8 of the telescope.

According to this example embodiment of the long-range optical device 1 the eyepiece 3 of the telescope is designed as a zoom eyepiece, that is with a variable, adjustable focal length. It is thus also possible that the current setting of the eyepiece 3 can be measured by a detector arranged in the eyepiece housing (not shown). By means of the display device 4 thus the corresponding current value of the set enlargement of the telescope can be displayed to the observer in the field of vision of the eyepiece together with the image of the remote object. According to one advantageous development of the telescope the focal length of the eyepiece 3 can be varied by an electric motor drive. In this way it is possible to take the desired value of the enlargement of the telescope to be set by entering a corresponding number value on the operating element 21. Both the input of the desired value of the enlargement and also the value of the currently set enlargement can be displayed in the field of vision of the eyepiece, without the user having to interrupt the viewing of the remote environment.

Figure 15:
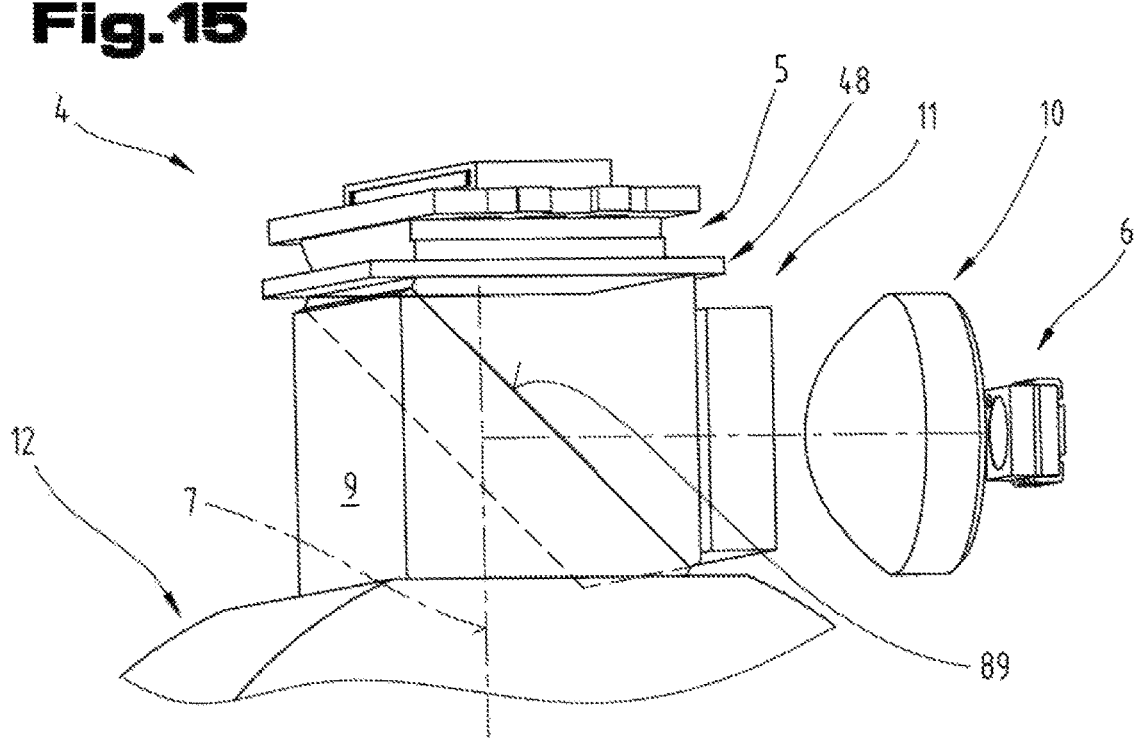
FIG. 15 is a detail of the display device according to FIG. 7.

FIG. 15 shows a detail of the display device 4 of the invention according to FIG. 7 in perspective view. To provide a better overview settings or housing parts of the optical elements have been omitted. The LCoS display 5 is illuminated with polarized light in that light emitted by the light source 6 after collimation by the illuminating lens 10 is polarised by the polarizer 11 and reflected by the illuminating prism 9 to the liquid crystal layer of the LCoS display 5. According to the alignment of the liquid crystal molecule of the display of the LCoS display 5 there a reflection of the polarised light selectively on individual pixels. Light reflected by the LCoS display 5 then passes through the illuminating prism 9 and the display prism 12 according to the display beam path 7, lastly to the observation beam path 8 (FIG. 7). The image produced on the LCoS display 5 is visible to an observer in this way through the eyepiece 3 superimposed with the image of a remote object (FIG. 1). In addition to the polarizer 11, which is arranged between the illuminating lens 10 and the illuminating prism 9 the display device 4 also comprises a wave plate 48. The latter is arranged between the illuminating prism 9 and the LCoS display 5. Preferably a λ/4 plate is used as the wave plate 48. This has the advantage that inhomogeneities in the yield of the polarized light during the illumination, as in the display device 4, can be kept as low as possible. Such a reduced yield of the polarized light can be caused by the comparatively large angular range of the light beam bundle from the light source 6.

The LCoS display 5, the wave plate 48 and the illuminating prism 9 are preferably connected securely to one another by adhesion. This means that the wave plate 48 is adhered on the one hand to the LCoS display 5 and on the other hand to the illuminating prism 9. Lastly, it is also possible that the illuminating prism 9 is adhered to the display prism 12. The display device 4 in this way forms a compact assembly, the components of which can be adjusted reliably and permanently during production. The adjustment of the display device 4 is finally only necessary relative to the optical axis of the observation beam path 8 on the assembly of the long-range optical device 1.

As already explained in connection with the control of the image generation by the main control unit 14 (FIG. 8, 9), there is also a continuous monitoring of the enlargement setting of the telescopic sight 1 by reading the zoom sensor 20.

Figure 16:
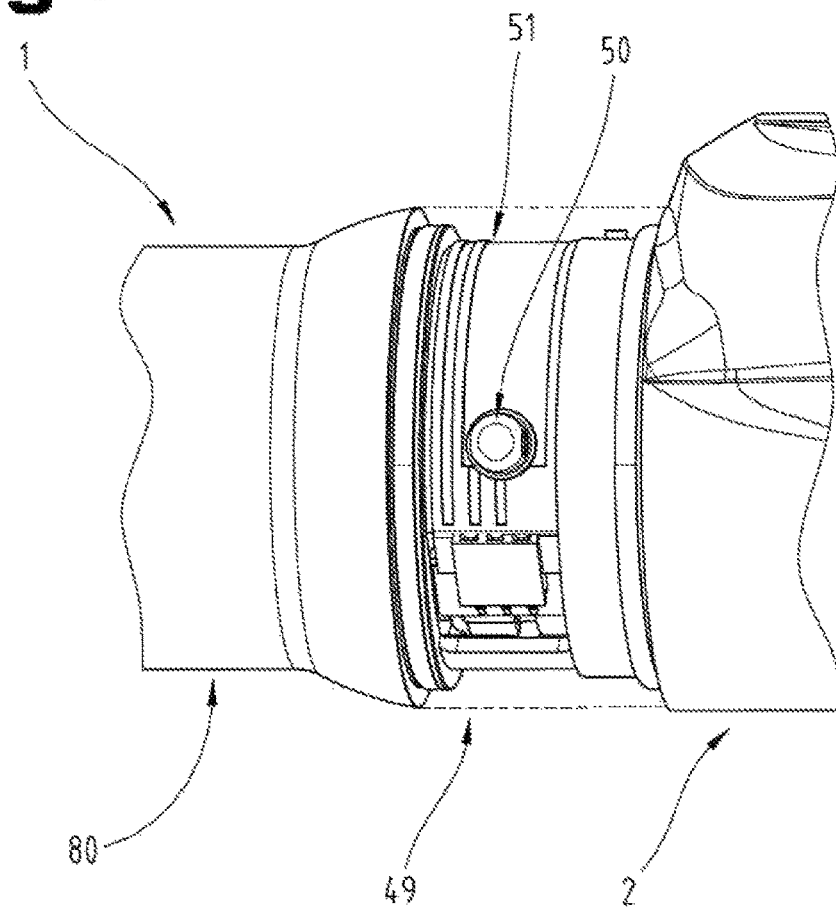
FIG. 16 is a detail of a side view of the telescopic sight according to FIG. 1.

FIG. 16 shows a detail of a side view of the telescopic sight 1 according to FIG. 1. A zoom adjusting ring 49 is arranged adjacent to the eyepiece housing 2. The zoom adjusting ring 49 is coupled mechanically to the adjustable lens 36, 37 of the lens reversing system 33 (FIG. 2). Furthermore, on an inner circumference of the zoom adjusting ring 49 a trigger 50 is provided for connecting to a foil potentiometer 51. According to this example embodiment the foil potentiometer 51 thus forms the zoom sensor 20. The trigger 50 is also rotated when rotating the zoom adjusting ring 49. The foil potentiometer 51 is, like the zoom adjusting ring 49, arranged curved annularly about the observation beam path 8. An adjusted enlargement setting can thus be detected electrically by the changed position of the zoom adjusting ring 49 or changed position of the trigger 50.

Figure 21:
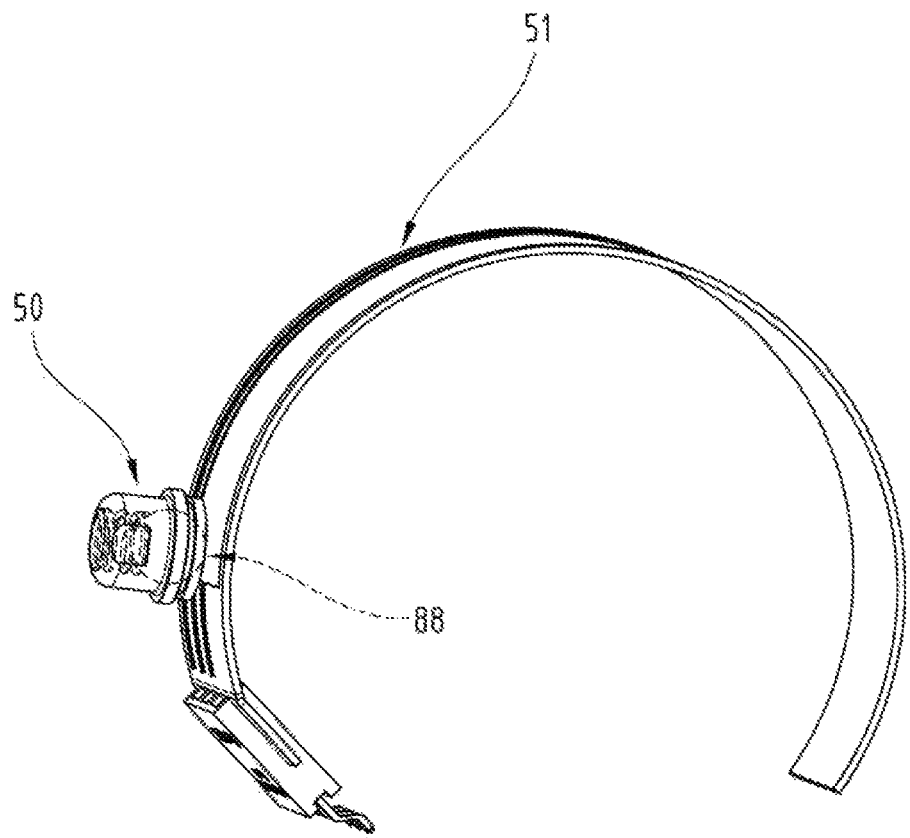
FIG. 21 is the device for detecting the enlargement setting according to FIG. 16.

The device for detecting the enlargement setting of the telescopic sight 1 is shown again separately in FIG. 21. FIG. 21 shows the device for detecting the enlargement setting according to FIG. 16, wherein for a better overview only the foil potentiometer 51 with its electric connections and the trigger 50 are shown. The foil potentiometer 51 consists of two resistance foils arranged a short distance apart and above one another. Depending on the position of the trigger 50 the latter acts on the two resistance foils of the foil potentiometer 51 and in this way creates a contact between the two resistance foils. For this purpose, the trigger 50 comprises a spring-loaded ball 88 which pushes against the two resistance foils of the foil potentiometer 51. The trigger 50 and thus also the ball 88 are moved by rotation of the zoom adjusting ring 49 over the circumference of the foil potentiometer 51, whereby the contact point between the two resistance foils is displaced accordingly and the total electric resistance is changed. The trigger 50 and also its ball 88 are thus not in electrical connection with the foil potentiometer 51. The ball 88 of the trigger 50 can be guided away by rolling or sliding over the foil potentiometer 51.

Figure 17:
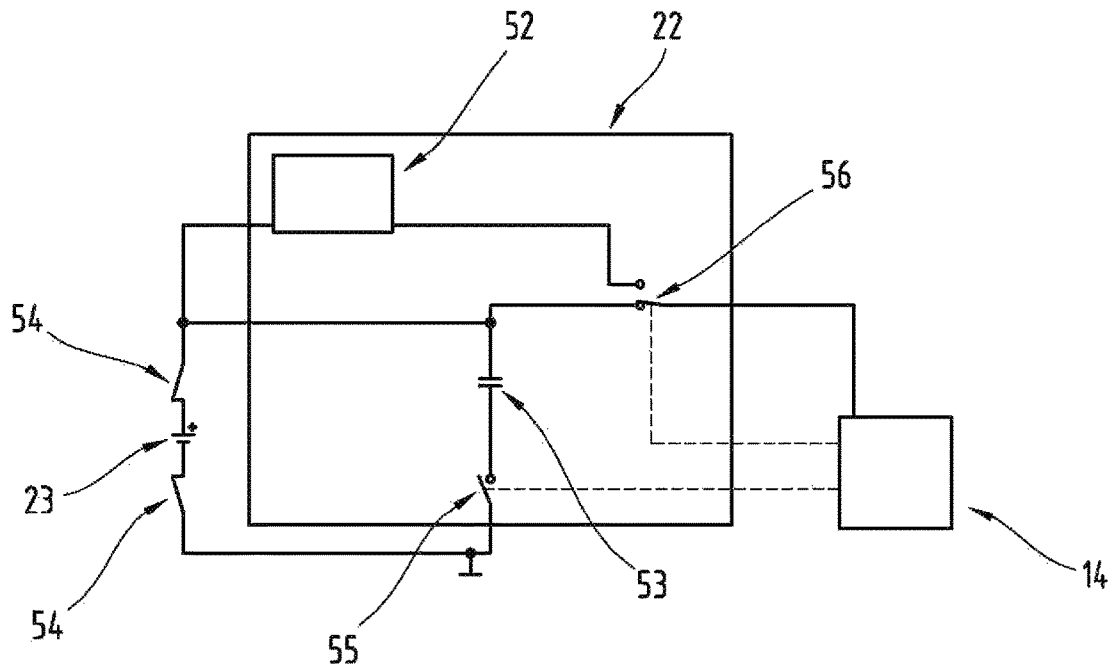
FIG. 17 is a detail of the control of the long-range optical device according to FIG. 8.

FIG. 17 shows a detail of the control of the long-range optical device 1 according to FIG. 8. Powered by the battery 23 the power supply unit 22 maintains the operation of the main control unit 14. According to this example embodiment the power supply unit 22 comprises a voltage controller 52. Furthermore, a capacitor 53 is provided in the power supply unit 22, to which the battery 23 is connected in parallel. Said capacitor 53 is provided as a buffer for bridging interruptions in the power voltage from the battery 23. Such interruptions can be provided in particular at high accelerations, such as when firing a shot. At this point there may possibly be a brief lifting of the battery contacts 54 from the poles of the battery 23. The battery contacts 54 are, as usual, pretensioned spring-elastically and thus bear against the two poles of the battery 23, whereby the electric contact is maintained. When using the capacitor 53 it is also the case that the latter is only charged after a user switches on the control of the telescopic sight 1. For this a switch 55 is provided in the circuit containing the battery 23 and the capacitor 53. After the user switches on the main control unit 14 by activating the operating element 21 (FIG. 8)—preferably with a time delay—by a switch logic of the main control unit 14 the switch 55 is activated so that the circuit is closed and the capacitor 53 is charged. The electrical energy stored in the capacitor 53 is thus available for bridging interruptions in the supply by the battery 23, for example in the case of recoil when firing a shot.

The voltage controller 52 provided according to FIG. 17 in the power supply unit 22 is also only activated by the user after switching on the control or the main control unit 14. For this an additional switch 56 is provided in the power supply unit 22 which can also be activated by the main control unit 14. Accordingly in the switch off state of the telescopic sight 1 only a part of a control logic of the main control unit 14 is active which is supplied with power directly from the battery 23. This part of the control logic (switch-on logic) of the main control unit 14 is used to monitor the activation of the operating elements 21 by a user. Only in the event of the activation of one of the operating elements 21 is there an activation by the main control unit 14 and thus the powering of the whole control by the voltage controller 52, in that the switch 56 is moved accordingly. Regardless of this by means of the switch-on logic the switch 55 is also activated so that the capacitor 53 can be charged.

Figure 18:
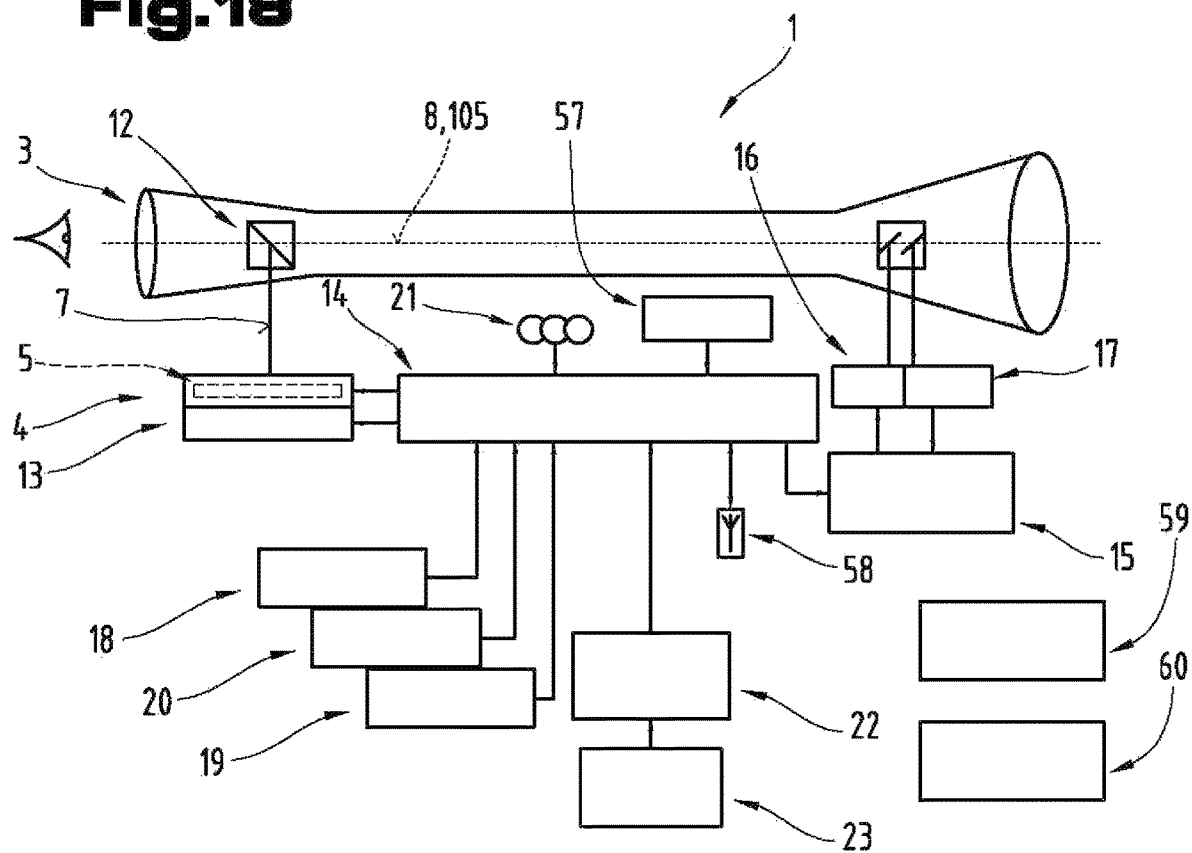
FIG. 18 is a block diagram of the control of the long-range optical device according to a further example embodiment.

FIG. 18 shows a block diagram of the control of the long-range optical device 1 according to a further example embodiment. Here the control of the telescopic sight 1 is also equipped with a ballistics computer 57. Furthermore, the control comprises an antenna 58, which is connected to the main control unit 14. Said antenna 58 allows a line-connected exchange of data with a corresponding remote control 59. The antenna 58 can be formed for example by a Bluetooth module or a WLAN module. Alternatively, the antenna 58 can also be designed in the form of near field communication components (RFID, NFC). By means of the remote control 59 for example it is possible to transmit ballistics data to the main control unit 14 of the telescopic sight 1.

Lastly, the antenna 58 can also be designed to communicate with other external device, such as for example with a Smartphone 60. It is thus also possible to change the mode of operation of the telescopic sight 1 or the main control unit 14 of the telescopic sight 1 by means of the Smartphone 60 and to configure the main control unit 14. Another possible application is to perform a firmware update of the main control unit 14. According to an alternative embodiment a ballistics computer or a corresponding software program is integrated into the Smartphone 60 itself. Suitable calculation results of the ballistics computer of the Smartphones 60 can be transmitted for further use by means of the antenna 58 on the main control unit 14 of the telescopic sight 1.

In addition to the detection of environmental conditions such as air pressure or temperature by means of suitable sensors, the measurement of the inclination of a firearm to the horizontal by means of an inclination sensor is particularly important. According to an alternative example embodiment of the control of the telescopic sight 1 other functions of the long-range optical device 1 are controlled on the basis of the detection of the inclination by the inclination sensor 18, by calculating an image to be shown in the LCoS display 5. Thus the main control unit 14 can be switched off automatically. This can be performed for example by prespecifying a specific time period or a maximum switch-on period. A gunman can avoid the automatic switching off for example by activating a switch-on button on the operating elements 21 before the expiry of a maximum switch-on period and this activation is registered by the main control unit 14. In this way the time period of the maximum switch-on period would begin again from the start.

According to the invention the detection of the inclination by the inclination sensor 18 is used as a switching signal for extending the period before automatically switching off the whole system. For this purpose in the main control unit 14 a limit value is determined for a maximum change in angle of the inclination measured by the inclination sensor 18. If a change in the angle of inclination is registered by the main control unit 14 in an observation period, which is greater than the given limit value, thus in this way automatic switching off is delayed further. Thus a gunman, by intentionally pivoting the telescopic sight 1, can cause the duration of the switched on state of the telescopic sight 1 to be extended. Furthermore, it is also possible that the maximum duration of the switched-on state or the remaining switching on time is displayed graphically to the gunman in the LCoS display 5. The remaining time can be shown for example by a continually shortening bar in the LCoS display 5. If a gunman would like the display to remain longer in the LCoS display 5, he can achieved this by intentionally moving or changing the inclination of the firearm or the telescopic sight 1 accordingly.

According to a preferred embodiment a limit value is set for a maximum change in angle for pivoting the telescopic sight 1 laterally or for laterally pivoting the telescopic sight 1. This means that pivoting laterally about the optical axis 105 of the telescopic sight 1 or about the running axis of the associated firearm serves as a switching signal for extending the period before switching off automatically. In an advantageous manner the power consumption of the battery 23 remains low by means of the described programming of the main control unit 14.

FIG. 20 shows a detail of the long-range optical device 1 according to FIGS. 1 and 2, showing a portion of the central tube 80 and the eyepiece housing 2. In a eyepiece side end of the central tube 80—shown by dashed lines—the electric components or assemblies of the main control unit 14 are shown.

As already mentioned several times above, different functions of the long-range optical device 1 can be influenced or controlled by a user by activating the operating elements 21 on the eyepiece housing 2. According to this example embodiment a measurement button 100, a minus button 101 and a plus button 102 are provided as the operating elements 21. Depending on the current operating state of the main control unit 14 and also depending on the duration of activation of said buttons 100, 101, 102 a user can control various functions of the long-range optical device 1, such as performing a distance measurement with the rangefinder 15 or the display with the display device 4. These functions include in particular: switching on the main control unit 14, switching it off, performing a distance measurement with the rangefinder 15, controlling the brightness of the display device 4 and determining the duration of the switched-on state of the main control unit 14. Further functions include switching on and controlling the brightness of a physical graticule in one of the intermediate image planes 32, 34 or switching on a Bluetooth device for creating a connection to an external device.

Switching on and performing a distance measurement, by pressing the measurement button 100 and keeping it pressed down the main control unit 14 is switched on or activated and at the same time a distance measurement is initiated, wherein by releasing the measurement button 100 the time point of performing the distance measurement by the rangefinder 15 is determined. A user can thus during the period of pressing down the measurement button 100 firstly aim at an object to be measured by aligning the long-range optical device 1 to said object and by releasing the measurement button 100 can then initiate the distance measurement. The measurement of the distance by means of the rangefinder 15 is then performed automatically or controlled by program by the main control unit 14. The determined value of the measured distance is displayed directly in the display device 4 to the user as a numerical value. At the same time a variable target displaced in the display device 4 is recalculated on the basis of the specific value of the distance and also additional measurement variables, such as the angle of inclination determined by the inclination sensor 18.

Switching off the main control unit 14: if the minus button 101 and the plus button 102 are depressed simultaneously for the duration of at least 1 second, the long-range optical device 1 or its main control device 14 are switched off.

Brightness control of the display device 4: if the main control unit 14 and also the display device 4 are in a switched-on state, by pressing the minus button 101 or the plus button 102 the brightness of the display 4 can be reduced or increased.

Changing the switching-on period of the long-range optical device 1: the main control unit 14 is programmed so that a value is defined for a maximum switching-on period of about 70 seconds. After this time period the long-range optical device 1 or its main control unit 14 switches off automatically in that it goes into base mode or idle mode. The switched on state can be extended by the user simply by pressing the minus button 101 or the plus button 102, whereby the predefined maximum switching-on period begins again from zero from the moment the button is activated. Alternatively, the user can also move the long-range optical device 1 such that a minimum value of a change of inclination can be detected by the inclination sensor 18, after which the duration of the switched on state is also extended by restarting the maximum switching-on period.

Graticule illumination: as explained above, the long-range optical device 1 is also equipped in addition to the display device 4 with a physical graticule in one of the intermediate image planes 32, 34. For said physical graticule a separate illuminating device is provided which can also be controlled by activating one of the operating elements 21 and the brightness of the latter can be controlled. It is possible to switch on the illumination of the physical graticule from the switched off state of the long-range optical device 1 and this is performed by briefly pressing down the minus button 101 and the plus button 102 simultaneously. After this by further activating the minus button 101 or the plus button 102 the brightness of the illumination of said physical graticule can be decreased or increased. The illumination of the physical graticule is thus independent of the activity of the display device 4, as the latter can remain switched off.

Bluetooth connection: preferably, the antenna 58 (FIG. 18) is formed by a "Bluetooth Low Energy" device (BTLE). From the idle state or idle mode of the main control unit 14 by activating the minus button 101 and the plus button 102 at the same time for the duration of 3 seconds the Bluetooth device can be switched on and a corresponding connection to an external device can be made. According to the program the Bluetooth connection is maintained for a maximum duration of about 10 minutes, at which time it is switched off automatically. The user can also switch it off early intentionally by simultaneously pressing the minus button 101 and the plus button 102.

Advantageously, the function of distance measurement by the rangefinder 15 is prioritized by program technology. This means that activating the measurement button 100—regardless of which operating state the main control unit 14 is currently in—always initiates a distance measurement. A distance measurement is performed automatically at the point of releasing the measurement button 100.

What concerns the arrangement of a joint in the objective housing with a bearing housing and lens tube mounted pivotably in the bearing housing it is also an advantage that at the eyepiece side end of the lens tubes and the bearing housing a ball joint is formed with a pivot point which lies on the optical axis of the long-range optical device.

The ball joint comprises bearing surfaces on the eyepiece side end of the lens tube and also bearing surfaces in the bearing housing, wherein the bearing surfaces are formed by ball areas and the ball areas are aligned to be at least approximately perpendicular to the optical axis. In this way it is possible that there is a sufficiently large diameter for passage to the reversing system or the eyepiece for the beam path coming from the objective of light from a remote object in the region of the joint.

The development of the long-range optical device is also advantageous in which bearing surfaces in an eyepiece side area relative to the pivot point have a first middle radius r1 relative to the optical axis and a first ball radius R1 and bearing surfaces in an object-side area relative to the pivot point have a second middle radius r2 relative to the optical axis and a second ball radius R2 and the ratio between the second middle radius r2 and the second ball radius R2 is smaller than the ratio between the first middle radius r1 and the first ball radius R1. This enables a high degree of recoil resistance of a suitably designed telescopic sight.

According to a preferred development of the long-range optical device a linear guide is formed in an eyepiece side end of the bearing housing and in the linear guide a rear objective lens system of the objective is mounted, wherein the rear objective lens system is displaceable parallel to a longitudinal extension of the device. By means of such an adjustment of the rear objective lens a remote object can be put into sharp focus.

A design is also advantageous in which a focal length of the front objective lens system is greater than a maximum distance of the pivot point of the joint from the front objective lens system.

Preferably, it is also possible that in the objective housing an adjusting device is formed for the height adjustment and an adjusting device is formed for lateral adjustment, wherein resulting adjusting forces or adjustments of the adjusting devices perpendicular to the longitudinal extension of the device are directed to the lens tube. When focusing a firearm together with a telescopic sight the target mark can thus be moved to overlap with the point of impact of the projectile.

A development is also advantageous in which a laser transmitter and a transmitter prism system are arranged between the objective and a first intermediate image plane and the transmitting beam path of the laser transmitter is connected by an interface of the transmitter prism system to the observation beam path, when the interface of the transmitter prism system is designed to have a dichroic coating.

According to a preferred embodiment of the long-range optical device, a transmitter lens formed by a converging lens is arranged between the laser transmitter and the transmitter prism system, as in this way less space is required for the optical components of the laser rangefinder. By means of the converging lens the beam path of the laser transmitter system is shortened accordingly.

A development is also advantageous in which a laser receiver and a receiver prism system are arranged between the transmitter prism system and the first intermediate image plane, wherein a receiver beam path of the laser receiver is connected by an interface of the receiver prism system to the observation beam path. Furthermore, the interface of the receiver prism system is formed by a dichroic coating. In this way, the observation beam path and the receiver beam path can be focused jointly by displacing the rear objective lens system. Furthermore, the receiver beam path and the observation beam path are aligned jointly by pivoting the front objective lens system. By displacing the rear objective lens system at the same time the transmitting beam path of the laser transmitter is focused on the remote object or target, whereby the measurement spot beamed by the emitted laser light is optimized.

According to a preferred embodiment variant of the long-range optical device, on an object-side opening of the device a cover glass is arranged, wherein a surface normal on one of the plane parallel surfaces of the cover glass is inclined relative to the longitudinal extension of the long-range optical device. In this case the surface normal of the cover glass relative to the longitudinal extension preferably has an angle with a value selected from a range between 0.5° and 2°. In this way unwanted reflections of the primary laser beam emitted by the laser transmitter to the laser receiver are largely prevented.

It has also proved to be advantageous that the adjusting device is arranged for height adjustment and the adjusting device is arranged for lateral adjustment at a distance from the pivot point, the value of which is approximately half a maximum distance of the pivot point from the front objective lens system.

According to one development of the long-range optical device, the adjusting device for the height adjustment and the adjusting device for the lateral adjustment each have a threaded spindle operable from the outside of the objective housing, wherein the threaded spindle is arranged sunk underneath an external contour of the objective housing.

An embodiment of the long-range optical device is also advantageous in which a removable cover is fixed at an access to the threaded spindle in the objective housing. In this way in an advantageous manner the adjusting devices are protected from erroneous, unintentional adjustment. It is also advantageous if the cover is designed as a tool for operating the threaded spindle.

According to an advantageous development of the device, the latter comprises a zoom sensor for detecting a value of an adjusted enlargement.

According to a preferred embodiment the zoom sensor comprises a foil potentiometer and a trigger connected to a zoom adjusting ring and acting on the foil potentiometer. The foil potentiometer is arranged to be curved coaxially relative to the zoom adjusting ring.

Preferably, the display control, to which the LCoS display is connected, also comprises a Field Programmable Gate Area (FPGA). In this way the power required for operating the device can be kept at a low level.

According to a preferred development of the long-range optical device the display control and the LCoS display are connected to one another by a bus system which comprises a Serial Peripheral Interface (SPI).

It is also an advantage if the clock generator comprises the display control, for clocking with a frequency of between 5 MHz and 50 MHz.

A development of the device is also advantageous which comprises a power supply unit with a battery, wherein the power supply unit comprises a capacitor and the capacitor is connected electrically in parallel with the battery. For a telescopic sight mounted on a firearm it is possible in this way to achieve a high degree of shooting safety. In this way it is possible to prevent an interruption of the power supply to the electronic system of the device when briefly lifting the battery contacts from the poles of the battery, which can be caused by the high accelerations when firing a shot.

It is also possible to achieve power-efficient operation by providing the main control unit with a switch-on logic, wherein the switch-on logic for operating a switch is designed for charging the capacitor in a switched-on state of the device.

A development of the device is also advantageous in which the main control unit is designed to have a control logic for switching off automatically after a maximum switch-on period has been reached.

An embodiment, in which the main control unit is designed to have a control logic for extending the value of the switch-on period, where reaching a limit of a maximum angle change of a value of an inclination measured by the inclination sensor is a switching signal, also has the advantage of providing a more practical handling of a telescopic sight. It is thus no longer necessary for a gunman to remove his hands from the shooting position of the firearm in order to delay the switching off of the electronic system and the display.

According to one development of the device, in which an antenna is connected to the main control unit, it is advantageous that a line-connected data exchange can be performed for example by a remote control or a Smartphone.

According to an advantageous development of the method, when the LCoS display is controlled by a display control in a temporal sequence of image writing sequences with image information data, between two consecutive image writing sequences the control of the LCoS display is interrupted for a period TP of an interval, wherein the period TP is equal to or greater than the value of a period TB of the image writing sequence. This has the advantage that the power required by the control and display can be kept low.

According to an advantageous development of the method, a period TW of an image cycle, corresponding to the sum of the period TB of the image writing sequence and the period TP of the interval, is selected from a range of 60 ms to 120 ms.

It is also an advantage if in the method during period TP of the interval the control of the LCoS display is interrupted by an image release signal DE and during period TP of the interval also the basic timed sequence CLK of a clock generator and the display control are switched off or currentless.

According to a preferred embodiment of the method an operating mode of producing the superimposed image is changed or can be changed reversibly from an "idle mode" to a "changeover mode." In this case in the idle mode a first value of a period TW 1 of the image cycle is selected from a range of 60 ms to 120 ms and in the changeover mode a second value of a period TW 2 of the image cycle is selected from a range that is less than or equal to 50 ms. In this way in different phases of the operation of the long-range optical device the sufficiently high quality of the images to be shown can be ensured. With the short period TW 2 of the image cycle in the changeover mode an image repeat rate of sufficiently high frequency is available, so that also relatively rapidly changing image contents can be seen that are constantly interweaving or constantly changing.

In a preferred method it is possible that a change in the operating mode from the idle mode to the changeover mode is triggered automatically by a main control unit of the long-range optical device. Particularly preferably, the main control unit monitors changes in the operating states of the long-range optical device and in the event of predefined occurrences the change of operating mode is triggered from the idle mode to the changeover mode.

A method is also advantageous in which the change of the operating mode from the idle mode to the changeover mode is triggered after initiating the measurement of the distance of a remote object with a rangefinder or the change of the operating mode from the idle changeover mode is triggered by detecting a change in the value of an inclination sensor.

A method is also advantageous in particular in which the change of the operating mode from the idle mode to the changeover mode is triggered by calculation of an integrated ballistics computer.

Embodiment variants of the method are also advantageous in which the change of the operating mode from the idle mode to the changeover mode is triggered by detecting a change of a value of a zoom sensor for establishing the current enlargement setting of the long-range optical device. In further embodiment variants also the detection of a change of value of a temperature sensor or the detection of an activation of an operating element of the long-range optical device are provided as triggers for a change of the operating mode.

Embodiment variants are also advantageous according to which in the method according to the invention image information data for displaying monochromatic images is produced and only image information data without greyscale is generated. In this way fewer data lines for controlling the LCoS display are required, and also the power needed for operating the control and the display of the long-range optical device can be kept at a low level.

The exemplary embodiments show possible embodiment variants of the long-range optical device 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, also individual features or combinations of features of the various shown and described example embodiments can represent independent solutions according to the invention.

The underlying problem addressed by the solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the individual embodiments shown in FIGS. 1 to 11; 12; 13, 14; 15; 16, 21; 17; 18; 19 and 20 can form the subject matter of independent solutions according to the invention. The objectives and solutions according to the invention relating thereto can be taken from the detailed descriptions of these figures.

Finally, as a point of formality, it should be noted that for a better understanding of the structure of the long-range optical device 1, the latter and its components have not been represented true to scale in part and/or have been enlarged and/or reduced in size.

| List of reference numerals | |
|---|---|
| 1 | long-range optical device |
| 2 | eyepiece housing |
| 3 | eyepiece |
| 4 | display The device |
| 5 | LCoS display |
| 6 | light source |
| 7 | display beam path |
| 8 | observation beam path |
| 9 | illuminating prism |
| 10 | illuminating lens |
| 11 | polarizer |
| 12 | display prism |
| 13 | display control |
| 14 | main control unit |
| 15 | rangefinder |
| 16 | laser transmitter |
| 17 | laser receiver |
| 18 | inclination sensor |
| 19 | temperature sensor |
| 20 | zoom sensor |
| 21 | operating element |
| 22 | power supply unit |
| 23 | battery |
| 24 | clock generator |
| 25 | bus system |
| 26 | gap counter |
| 27 | line counter |
| 28 | image writing sequence |
| 29 | interval |
| 30 | image cycle |
| 31 | objective |
| 32 | intermediate image plane |
| 33 | lens reversing system |
| 34 | intermediate image plane |
| 35 | transmitter prism system |

-continued

| List of reference numerals | |
|---|---|
| 36 | receiver prism system |
| 37 | lens |
| 38 | lens |
| 39 | field lens |
| 40 | diverging lens |
| 41 | prism reversing system |
| 42 | roof prism |
| 43 | deflecting prism |
| 44 | deflecting prism |
| 45 | deflecting prism |
| 46 | display prism |
| 47 | coupling prism |
| 48 | wave plate |
| 49 | zoom adjusting ring |
| 50 | trigger |
| 51 | foil potentiometer |
| 52 | voltage controller |
| 53 | capacitor |
| 54 | battery contact |
| 55 | switch |
| 56 | switch |
| 57 | ballistics computer |
| 58 | antenna |
| 59 | remote control |
| 60 | Smartphone |
| 61 | front objective lens system |
| 62 | rear objective lens system |
| 63 | objective housing |
| 64 | lens tube |
| 65 | setting |
| 66 | bearing housing |
| 67 | pivot point |
| 68 | bearing surface |
| 69 | bearing surface |
| 70 | adjusting device |
| 71 | threaded spindle |
| 72 | pressure pin |
| 73 | setting |
| 74 | interface |
| 75 | range |
| 76 | interface |
| 77 | deflecting prism |
| 78 | transmitter lens |
| 79 | diameter |
| 80 | central tube |
| 81 | cover glass |
| 82 | cover |
| 83 | lock |
| 84 | cover |
| 85 | interface |
| 86 | rod |
| 87 | parallax button |
| 88 | ball |
| 89 | interface |
| 100 | measurement button |
| 101 | minus button |
| 102 | plus button |
| $r_1$ | radius |
| $r_2$ | radius |
| $R_1$ | ball radius |
| $R_2$ | ball radius |
| f | focal length |
| D | distance |

The invention claimed is:

1. A long-range optical device comprising:
   at least one objective and at least one eyepiece and at least one prism reversing system with a roof prism and a deflecting prism, through which a first observation beam path is formed;
   a display beam splitter formed by the deflecting prism;
   an illuminating beam splitter;
   an opto-electronic display, for displaying variable data or a target mark; and a light source, wherein light of the light source is reflected by the illuminating beam splitter to the opto-electronic display and reflected by the opto-electronic display defining reflected image information to be displayed, the reflected image information passing through the illuminating beam splitter and is coupled into the first observation beam path at an interface of the deflecting prism, an image produced on the opto-electronic display being superimposed with an image of a remote object in the first observation beam path by the display beam splitter, and wherein between the illuminating beam splitter and the opto-electronic display a wave plate is arranged, wherein the wave plate is formed by a λ/4 plate.

2. The device as claimed in claim 1, wherein a section of a transition of a display beam path to the first observation beam path is localized at an interface of the display beam splitter as a part of the prism reversing system.

3. The device as claimed in claim 1, wherein the opto-electronic display, the λ/4 plate and the illuminating beam splitter are joined together respectively by adhesion.

4. The device as claimed in claim 1, wherein the opto-electronic display is connected to a display control, wherein the display control comprises a Field Programmable Gate Array (FPGA).

5. The device as claimed claim 4, wherein the display control and the opto-electronic display are connected to one another by a bus system, wherein the bus system comprises a Serial Peripheral Interface (SPI).

6. The device as claimed in claim 1, wherein it comprises a rangefinder with a laser transmitter and a laser receiver.

7. The device as claimed in claim 6, wherein a transmitting beam path of the laser transmitter runs at least partly in the first observation beam path.

8. The device as claimed in claim 6, wherein the main control unit is designed for generating image information data for representing a variable graticule or a distance to a remote object on the opto-electronic display.

9. The device as claimed in claim 1, wherein it comprises an inclination sensor.

10. The device as claimed in claim 1, wherein it comprises a main control unit with a ballistics computer.

11. The device as claimed in claim 1, wherein the opto-electronic display comprises a LCoS display.

* * * * *